US012776270B2

(12) United States Patent
Kim et al.

(10) Patent No.: US 12,776,270 B2
(45) Date of Patent: Oct. 27, 2026

(54) DISPLAY DEVICE

(71) Applicant: LG Display Co., Ltd., Seoul (KR)

(72) Inventors: DongSoo Kim, Seoul (KR); Jaesung Kim, Uijeongbu-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/035,806

(22) Filed: Jan. 23, 2025

(65) Prior Publication Data

US 2025/0265994 A1 Aug. 21, 2025

(30) Foreign Application Priority Data

Feb. 19, 2024 (KR) ........................ 10-2024-0023272

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0819* (2013.01); *G09G 2300/0852* (2013.01); *G09G 2300/0861* (2013.01); *G09G 2310/08* (2013.01)

(58) Field of Classification Search
CPC .. G09G 3/2007; G09G 3/3233; G09G 3/3266; G09G 3/3291; G09G 2300/0426; G09G 2300/0819; G09G 2300/0852; G09G 2300/0861; G09G 2310/08; H10D 30/6745; H10D 30/6755
See application file for complete search history.

(56) References Cited

U.S. PATENT DOCUMENTS

| | | | | | |
|---|---|---|---|---|---|
| 11,087,680 | B2 * | 8/2021 | Tsuboi | ................. | G09G 3/3233 |
| 2021/0027719 | A1 * | 1/2021 | Cho | ................. | G09G 3/3291 |
| 2023/0402007 | A1 * | 12/2023 | Chae | ................. | G09G 3/3233 |
| 2025/0061853 | A1 * | 2/2025 | Ha | ................. | G09G 3/3233 |
| 2025/0148972 | A1 * | 5/2025 | Huang | ................. | H10K 59/131 |
| 2025/0308448 | A1 * | 10/2025 | No | ................. | G09G 3/2007 |
| 2025/0391370 | A1 * | 12/2025 | Ha | ................. | G09G 3/3241 |

FOREIGN PATENT DOCUMENTS

| | | | | |
|---|---|---|---|---|
| KR | 10-2021-0013488 A | | 2/2021 | |
| WO | WO-2023230826 A1 | * | 12/2023 | ........... G09G 3/3233 |

* cited by examiner

*Primary Examiner* — Julie Anne Watko
(74) *Attorney, Agent, or Firm* — Morgan, Lewis & Bockius LLP

(57) ABSTRACT

A display device may include a plurality of pixels configured to implement an image, each including a light emitting diode and a pixel circuit connected to the light emitting diode, the pixel circuit including a driving transistor which may include a first electrode connected to a first node, a gate electrode connected to a second node, and a second electrode connected to a third node and may be configured to control a driving current flowing through the light emitting diode; fourth and fifth transistors configured to form a current movement path of the driving current; and a sixth transistor configured to initialize the second capacitor. At least one of the fourth transistor and the fifth transistor may include a first gate electrode and a second gate electrode, and a voltage applied to the first gate electrode may be lower than a voltage applied to the second gate electrode.

14 Claims, 16 Drawing Sheets

DISPLAY DEVICE

CROSS-REFERENCE TO RELATED APPLICATION

This application claims the priority of Korean Patent Application No. 10-2024-0023272, filed on Feb. 19, 2024, in the Korean Intellectual Property Office, the disclosure of which is incorporated herein by reference.

BACKGROUND

Field

The present disclosure relates to a display device including an organic light emitting diode.

Description of Related Art

As it enters an information era, a display field which visually expresses electrical information signals has been rapidly developed, and in response to this, various display devices having excellent performances, such as thin-thickness, light weight, and low power consumption, have been developed. Examples of such a display device include a liquid crystal display device (LCD) and an organic light emitting display device (OLED).

Such a display device may include a display panel in which pixel arrays for displaying images are disposed and a driving circuit, such as a data driver, a gate driver, and a timing controller. The data driver supplies a data signal to data lines disposed in the display panel, the gate driver sequentially supplies a gate signal to gate lines disposed in the display area, and the timing controller controls the data driver and the gate driver.

SUMMARY

An object to be achieved by the present disclosure is to provide a display device which is capable of ensuring or improving reliability of an emission control transistor.

Another object to be achieved by the present disclosure is to provide a display device which expresses an exact or more precise luminance corresponding to a predetermined gray scale level.

Objects of the present disclosure are not limited to the above-mentioned objects, and other objects, which are not mentioned above, can be clearly understood by those skilled in the art from the following descriptions.

To achieve these and other objects of the present disclosure, and according to an aspect of the present disclosure, a display device may include a plurality of pixels configured to implement an image, each of the plurality of pixels including a light emitting diode and a pixel circuit connected to the light emitting diode, the pixel circuit including a driving transistor which may include a first electrode connected to a first node, a gate electrode connected to a second node, and a second electrode connected to a third node, and may be configured to control a driving current flowing through the light emitting diode; a first capacitor configured to store a gate-source voltage Vgs of the driving transistor; a second capacitor connected to the first node; a first transistor configured to apply a data voltage to the driving transistor; a second transistor configured to initialize a gate electrode of the driving transistor; a third transistor configured to reset the light emitting diode; a fourth transistor and a fifth transistor configured to form a current movement path through which the driving current moves; and a sixth transistor configured to initialize the second capacitor, wherein at least one of the fourth transistor and the fifth transistor may include a first gate electrode and a second gate electrode, and a voltage applied to the first gate electrode may be lower than a voltage applied to the second gate electrode.

Other detailed matters of various example embodiments are included in the detailed description and the drawings.

According to an example embodiment of the present disclosure, when a voltage applied to a second gate electrode is lower than a voltage applied to a first gate electrode of an emission control transistor, a fluctuation of the threshold voltage is minimized or reduced to improve a reliability of an N-type oxide semiconductor transistor for emission control.

According to an example embodiment of the present disclosure, a reset voltage varies according to the luminance of the light emitting diode so that the light emitting diode may express an exact or more precise gray scale level in all the luminance.

The effects according to the present disclosure are not limited to the contents exemplified above, and more various effects are included in the present specification.

Additional features and aspects of the present disclosure are set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures as claimed.

BRIEF DESCRIPTION OF DRAWINGS

The accompanying drawings, which are included to provide a further understanding of the present disclosure and are incorporated in and constitute a part of this application, illustrate aspects of the disclosure and together with the description serve to explain various principles of the present disclosure. In the drawings.

DETAILED DESCRIPTION

Figure 1:
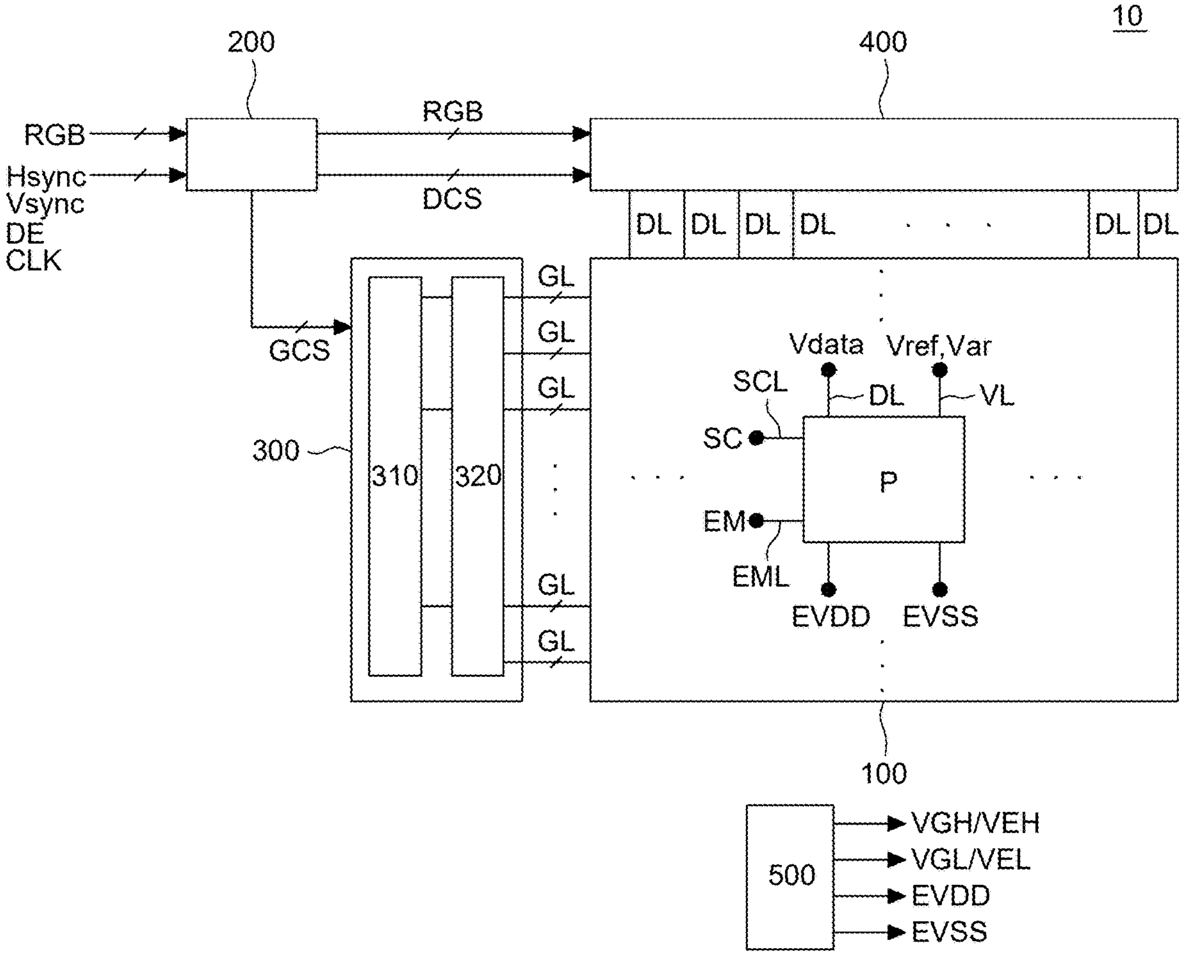
FIG. 1 is a block diagram schematically illustrating a display device according to an example embodiment of the present disclosure.

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with a more limiting term like "only". Any references to singular may include plural, and vice versa, unless expressly stated otherwise.

Components are interpreted to include an ordinary error range even if not expressly stated.

Where the position relation between two parts is described using the terms such as "on", "above", "below", and "next", one or more parts may be positioned between the two parts unless the terms are used with a more limiting term like "immediately" or "directly".

Where an element or layer is disposed "on" another element or layer, another layer or another element may be interposed directly on the other element or therebetween.

Although the terms "first", "second", and the like may be used for describing various components, these components are not confined by these terms. These terms are merely used for referring to one component separately from the other components. Therefore, a first component to be mentioned below may be a second component, and vice versa, in a technical concept of the present disclosure.

Like reference numerals generally denote like elements throughout the specification unless otherwise specified.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to example embodiments of the present disclosure will be described in detail with reference to accompanying drawings.

FIG. 1 is a block diagram schematically illustrating a display device according to an example embodiment of the present disclosure.

As shown in FIG. 1, the display device 10 includes a display panel 100 including a plurality of pixels P, a controller 200, a gate driver 300 which supplies a gate signal to each of the plurality of pixels P, a data driver 400 which supplies a data signal to each of the plurality of pixels P, and a power supply unit 500. The power supply unit 500 supplies the power required for driving to each of the plurality of pixels P.

The display panel 100 includes a display area in which a pixel P is located and a non-display area which is disposed to enclose the display area. A gate driver 300 and a data driver 400 are disposed in the non-display area.

In the display panel 100, the plurality of gate lines GL and the plurality of data lines DL intersect each other and the plurality of pixels P is connected to the gate lines GL and the data line DL, respectively. Specifically, one pixel P is supplied with a gate signal from the gate driver 300 through the gate line GL, is supplied with a data signal from the data driver 400 through the data line DL, and is supplied with a high potential driving voltage EVDD and a low potential driving voltage EVSS from the power supply unit 500.

Here, the gate line GL supplies a scan signal SC and an emission control signal EM and the data line DL supplies a data voltage Vdata. Further, according to various example embodiments, the gate line GL may include a plurality of gate lines SCL which supplies a scan signal SC and an emission control signal line EML which supplies the emission control signal EM. Further, the plurality of pixels P further includes a power line VL to be supplied with a reset voltage Var and a reference voltage Vref.

Further, each pixel P includes a light emitting diode and a pixel circuit which controls the operation of the light emitting diode. Here, the light emitting diode may include an organic emission layer.

The pixel circuit includes a plurality of switching elements, a driving element, and a capacitor. Here, the switching element and the driving element may be configured by thin film transistors. In the pixel circuit, the driving element controls an amount of currents to be supplied to the light emitting diode in accordance with the data voltage to adjust an emission amount of the light emitting diode. Further, the plurality of switching elements receives a scan signal SC supplied through the plurality of gate lines SCL and an emission control signal EM supplied through the emission control signal line EML to operate the pixel circuit.

The display panel 100 may be implemented as a non-transmissive display panel or a transmissive display panel. The transmissive display panel may be applied to a transparent display device in which an image is displayed on a screen and real objects in the background are visible. The display panel 100 may be manufactured as a flexible display panel. The flexible display panel may be implemented by an OLED panel which uses a plastic substrate.

Each pixel P may be divided into a red pixel, a green pixel, and a blue pixel to implement colors. Each pixel P may further include a white pixel. Each pixel P includes a pixel circuit.

Touch sensors may be disposed on the display panel 100. The touch input may be sensed using separate touch sensors or sensed by pixels P. The touch sensors may be disposed on the screen of the display panel 100 in an on-cell type or an add-on type or implemented as in-cell type touch sensors embedded in the display panel 100.

The controller 200 processes image data RGB input from the outside to be suitable for a size and a resolution of the display panel 100 to supply the processed image data to the data driver 400. The controller 200 generates a gate control signal GCS and a data control signal DCS using synchronization signals input from the outside, for example, a dot clock signal CLK, a data enable signal DE, a horizontal synchronization signal Hsync, and a vertical synchronization signal Vsync. The generated gate control signal GCS and data control signal DCS are supplied to the gate driver 300 and the data driver 400, respectively, to control the gate driver 300 and the data driver 400.

The controller 200 may be configured to be coupled with various processors, such as a microprocessor, a mobile processor, or an application processor, depending on a device to be mounted.

A host system may be any one of a television (TV) system, a set top box, a navigation system, a personal computer PC, a home theater system, a mobile device, a wearable device, and a vehicle system.

The controller 200 multiples an input frame frequency by i and may control an operating timing of a display panel driver with a frame frequency of an input frame frequency×i (i is a positive integer larger than 0) Hz. The input frame frequency is 60 Hz in a national television standards committee (NTSC) standard and is 50 Hz in a phase-alternating line (PAL) standard.

The controller 200 generates a signal to allow the pixel P to be driven at various refresh rates. That is, the controller 200 generates signals associated with the driving to allow the pixel P to be driven in a variable refresh rate (VRR) mode or to be switchable between a first refresh rate and a second refresh rate. For example, the controller 200 may drive the pixel P at various refresh rates by simply changing a rate of a clock signal, or generating a synchronization signal to generate a horizontal blank or a vertical blank, or driving the gate driver 300 in a mask manner.

The controller 200 generates a gate control signal GCS for controlling an operating timing of the gate driver 300 and a data control signal DSC for controlling an operating timing of the data driver 400, based on timing signals Vsync, Hsync, and DE received from the host system. The controller 200 controls the operating timing of the display panel driver to synchronize the gate driver 300 and the data driver 400.

A voltage level of the gate control signal GCS output from the controller 200 is converted into gate-on voltages VGL and VEL and gate-off voltages VGH and VEH through a level shifter which is not illustrated to be supplied to the gate driver 300. The level shifter converts a low level voltage of the gate control signal GCS into the gate low voltage VGL and converts a high level voltage of the gate control signal GCS into a gate high voltage VGH. The gate control signal GCS includes a start pulse and a shift clock.

The gate driver 300 supplies the scan signals SC to the gate lines GL in accordance with the gate control signal GCS supplied from the controller 200. The gate driver 300 may be disposed at one side or both sides of the display panel 100 in a gate in panel (GIP) manner.

The gate driver 300 sequentially outputs the gate signals to the plurality of gate lines GL under the control of the controller 200. The gate driver 300 shifts the gate signal using a shift register to sequentially supply the signals to the gate lines GL.

The gate signal may include a scan signal SC and an emission control signal EM in the organic light emitting display device. The scan signal SC includes a scan pulse swinging between the gate-on voltage VGL and the gate-off voltage VGH. The emission control signal EM may include an emission control signal pulse swinging between the gate-on voltage VEL and the gate-off voltage VEH.

The scan pulse is synchronized with the data voltage Vdata to select the pixels P of a line in which the data is written. The emission control signal EM defines an emission time of the pixels P.

The gate driver 300 may include an emission control signal driver 310 and at least one or more scan drivers 320.

The emission control signal driver 310 outputs an emission control signal pulse in response to a start pulse and a shift clock from the controller 200 and sequentially shifts the emission control signal pulse in accordance with a shift clock.

At least one or more scan drivers 320 output the scan pulse in response to a start pulse and a shift clock from the controller 200 and shift a scan pulse in accordance with the shift clock timing.

The data driver 400 converts image data RGB into a data voltage Vdata in accordance with the data control signal DCS supplied from the controller 200 and supplies the converted data voltage Vdata to the pixel P through the data line DL.

Even though in FIG. 1, it is illustrated that one data driver 400 is disposed at one side of the display panel 100, the number of the data drivers 400 and a placement position thereof are not limited thereto.

That is, the data driver 400 may comprise a plurality of integrated circuits (IC) and may be divided into a plurality of parts at one side of the display panel 100.

The power supply unit 500 generates the DC power required to drive the pixel array of the display panel 100 and the display panel driver using a DC-DC converter. The DC-DC converter may include a charge pump, a regulator, a buck converter, and a boost converter. The power supply unit 500 receives a DC input voltage applied from the host system which is not illustrated to generate a DC voltage, such as a gate-on voltage VGL, VEL, a gate-off voltage VGH, VEH, a high potential driving voltage EVDD, and a low potential driving voltage EVSS. The gate-on voltage VGL, VEL and the gate-off voltage VGH, VEH are supplied to the level shifter which is not illustrated and the gate driver 300. The high potential driving voltage EVDD and the low potential driving voltage EVSS are commonly supplied to the pixels P.

Figure 2:
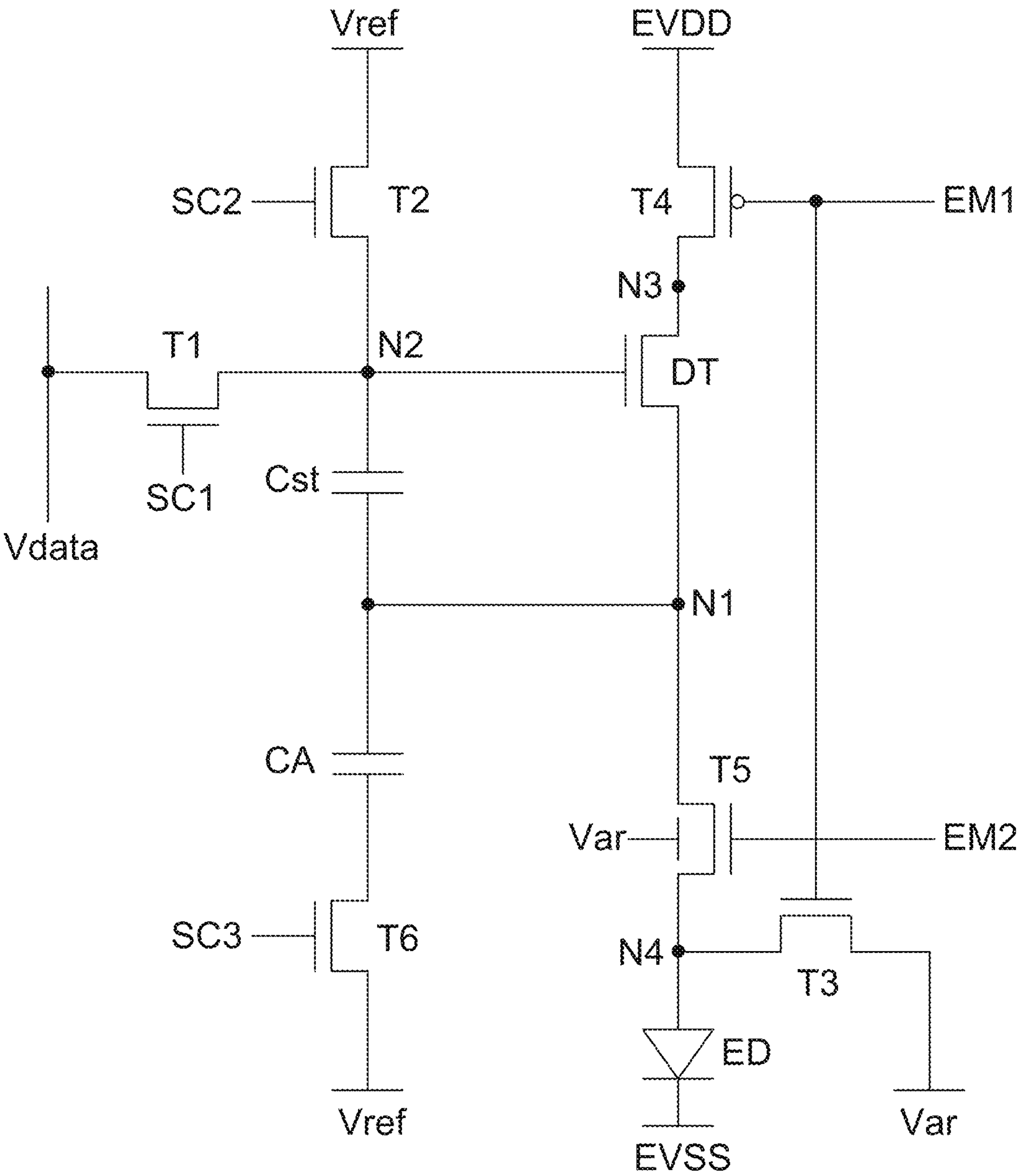
FIG. 2 is a view for an example pixel circuit in a display device according to an example embodiment of the present disclosure.

FIG. 2 is a view for a pixel circuit in a display device according to an example embodiment of the present disclosure.

As shown in FIG. 2, each of the plurality of pixels P may include a pixel circuit having a driving transistor DT and a light emitting diode ED connected to the pixel circuit.

The pixel circuit controls the driving current which flows in the light emitting diode ED to drive the light emitting diode ED. The pixel circuit may include a driving transistor DT, first to sixth transistors T1 to T6, and a plurality of capacitors Cst and CA. Each of the transistors DT, T1 to T6 may include a first electrode, a second electrode, and a gate electrode. One of the first electrode and the second electrode is a source electrode and the other one of the first electrode and the second electrode may be a drain electrode.

Each of the transistors DT, T1 to T6 may be a P-type thin film transistor or an N-type thin film transistor. In the example embodiment of FIG. 2, only the fourth transistor T4 is a P-type thin film transistor and the other transistors DT, T1 to T3, T5, and T6 are N-type thin film transistors. Further, the N-type thin film transistor may be an oxide thin film transistor and the P-type thin film transistor may be a polycrystalline silicon thin film transistor.

Accordingly, only the fourth transistor T4 is applied with a low level of voltage to be turned on and the other transistors DT, T1 to T3, T5, and T6 are applied with a high level of voltage to be turned on.

According to an example, the first transistor T1 of the pixel circuit may serve as a data supply transistor, the second and sixth transistors T2 and T6 may serve as initialization transistors, third transistor T3 may serve as a reset transistor, and the fourth and fifth transistors T4 and T5 may serve as emission control transistors.

The light emitting diode ED may include an anode electrode and a cathode electrode. The anode electrode of the light emitting diode ED is connected to a fourth node N4 and the cathode is connected to a low potential driving voltage EVSS.

The driving transistor DT may include a first electrode connected to a first node N1, a second electrode connected to a third node N3, and a gate electrode connected to a second node N2. The driving transistor DT may provide a driving current to the light emitting diode ED based on a voltage of the first node N1 (or a data voltage stored in a first capacitor Cst to be described below).

The first capacitor Cst may be connected or formed between the first node N1 and the second node N2. The first capacitor Cst may store or maintain a gate-source voltage Vgs of the driving transistor DT.

The first transistor T1 may include a first electrode which is connected to a data line DL (or receives a data voltage Vdata), a second electrode connected to the second node N2, and a gate electrode which receives a first scan signal SC1. The first transistor T1 is turned on in response to the first scan signal SC1 and transmits the data voltage Vdata to the second node N2. Such a first transistor T1 may be a data supply transistor.

The second transistor T2 may include a first electrode which receives a reference voltage Vref, a second electrode connected to the second node N2, and a gate electrode which receives the second scan signal SC2. The second transistor T2 is turned on in response to a second scan signal SC2 and transmits the reference voltage Vref to the second node N2. The second transistor T2 may be a first initialization transistor configured to initialize the second node N2 to the reference voltage Vref.

The third transistor T3 may include a first electrode which receives a reset voltage Var, a second electrode connected to the fourth node N4, and a gate electrode which receives the first emission control signal EM1.

The third transistor T3 is turned on in response to the first emission control signal EM1, before the light emitting diode ED emits light (or after the light emitting diode ED emits light) and resets the anode electrode (or the pixel electrode) of the light emitting diode ED using the reset voltage Var. The light emitting diode ED may have a parasitic capacitor formed between the anode electrode and the cathode electrode. Further, the parasitic capacitor is charged while the light emitting diode ED emits light so that the anode electrode of the light emitting diode ED may have a specific voltage. Accordingly, the reset voltage Var is applied to the anode electrode of the light emitting diode ED through the third transistor T3 to initialize a quantity of charges accumulated in the light emitting diode ED.

The fourth transistor T4 and the fifth transistor T5 (or first and second emission control transistors) are connected between the high potential driving voltage EVDD and the light emitting diodes ED and form a current movement path through which the driving current generated by the driving transistor DT moves.

The fourth transistor T4 may include a first electrode which receives a high potential driving voltage EVDD, a second electrode connected to the third node N3, and a gate electrode which receives a first emission control signal EM1.

The fifth transistor T5 may include a first electrode connected to the first node N1, a second electrode connected to the fourth node N4 (or the anode electrode of the light emitting diode ED), a first gate electrode which receives the second emission control signal EM2, and a second gate electrode which receives the reset voltage Var.

The fourth and fifth transistors T4 and T5 are turned on in response to the plurality of emission control signals EM1 and EM2 and the reset voltage Var and in this case, the driving current is supplied to the light emitting diode ED and the light emitting diode ED emits light with a luminance corresponding to the driving current.

In the present disclosure, the gate electrodes of the third and fourth transistors T3 and T4 are configured to commonly receive the first emission control signal EM1. However, the present disclosure is not essentially limited thereto and the gate electrodes of the third and fourth transistors T3 and T4 are configured to receive separate first emission control signals to be independently controlled.

The sixth transistor T6 may include a first electrode which receives a reference voltage Vref, a second electrode connected to the second capacitor CA, and a gate electrode which receives the third scan signal SC3. The sixth transistor T6 is turned on in response to the third scan signal SC3 and transmits the reference voltage Vref to one electrode of the second capacitor CA. The sixth transistor T6 may be a second initialization transistor configured to initialize one electrode of the second capacitor CA to the reference voltage Vref.

The second capacitor CA may be connected or formed between the first node N1 and the second electrode of the sixth transistor T6. The second capacitor CA may store or maintain a voltage between the first node N1 and the second electrode of the sixth transistor T6.

In the meantime, a display device according to the example embodiment of the present disclosure may operate as a variable refresh rate (VRR) mode display device. In the VRR mode, the pixel is driven at a constant frequency and at a timing when a high speed driving is necessary, a refresh rate at which the data voltage Vdata is updated is increased to operate the pixel. Further, at a timing when the power consumption needs to be lowered or low-speed driving is necessary, the refresh rate is lowered to operate the pixel.

Each of the plurality of pixels P may be driven by a combination of a refresh frame and a hold frame in one second. In the present disclosure, one set is defined that a combination of a refresh period in which the data voltage Vdata is updated and a hold period in which the data voltage Vdata is not updated is repeated for one second. One set period is a period in which a combination of the refresh period and the hold period is repeated.

When the pixel is driven at the refresh rate of 120 Hz, the pixel may be driven only with the refresh period. That is, the refresh period is driven 120 times in one second. One refresh period is $\frac{1}{120}$=8.33 ms and one set period is also 8.33 ms.

When the refresh rate is driven at 60 Hz, the refresh period and the hold period may be alternately driven. That is, the refresh period and the hold period may be alternately driven 60 times each in one second. One refresh period and one hold period are 0.5/60=8.33 ms and one set period is 16.66 ms.

When the refresh rate is driven at 1 Hz, one frame may be driven with one refresh period and 119 hold periods after the one refresh period. Further, when the refresh rate is driven at 1 Hz, one frame may be driven with a plurality of refresh periods and a plurality of hold periods. At this time, one refresh period and one hold period are $\frac{1}{120}$=8.33 ms and one set is 1 s.

In the refresh period, a new data voltage Vdata is charged to apply a new data voltage Vdata to the driving transistor DT and in the hold period, a data voltage Vdata of a previous frame is held to be used as it is. In the meantime, in the hold period, a process of applying the new data voltage Vdata to the driving transistor DT is omitted so that the hold period is also referred to as a skip period.

Each of the plurality of pixels P may initialize a voltage which is charged in the pixel circuit or remains during the refresh period. Specifically, each of the plurality of pixels P may remove the influence of the data voltage Vdata and the high potential driving voltage EVDD stored in the previous frame in the refresh period. Accordingly, each of the plurality of pixels P may display an image corresponding to a new data voltage Vdata in the hold period.

Each of the plurality of pixels P supplies a driving current corresponding to the data voltage Vdata to the light emitting diode ED to display images and maintains a turned-on state of the light emitting diode ED, during the hold period.

Hereinafter, the driving of the pixel circuit and the light emitting diode of a refresh period of a display device according to an example embodiment of the present disclosure will be described.

Figure 3:
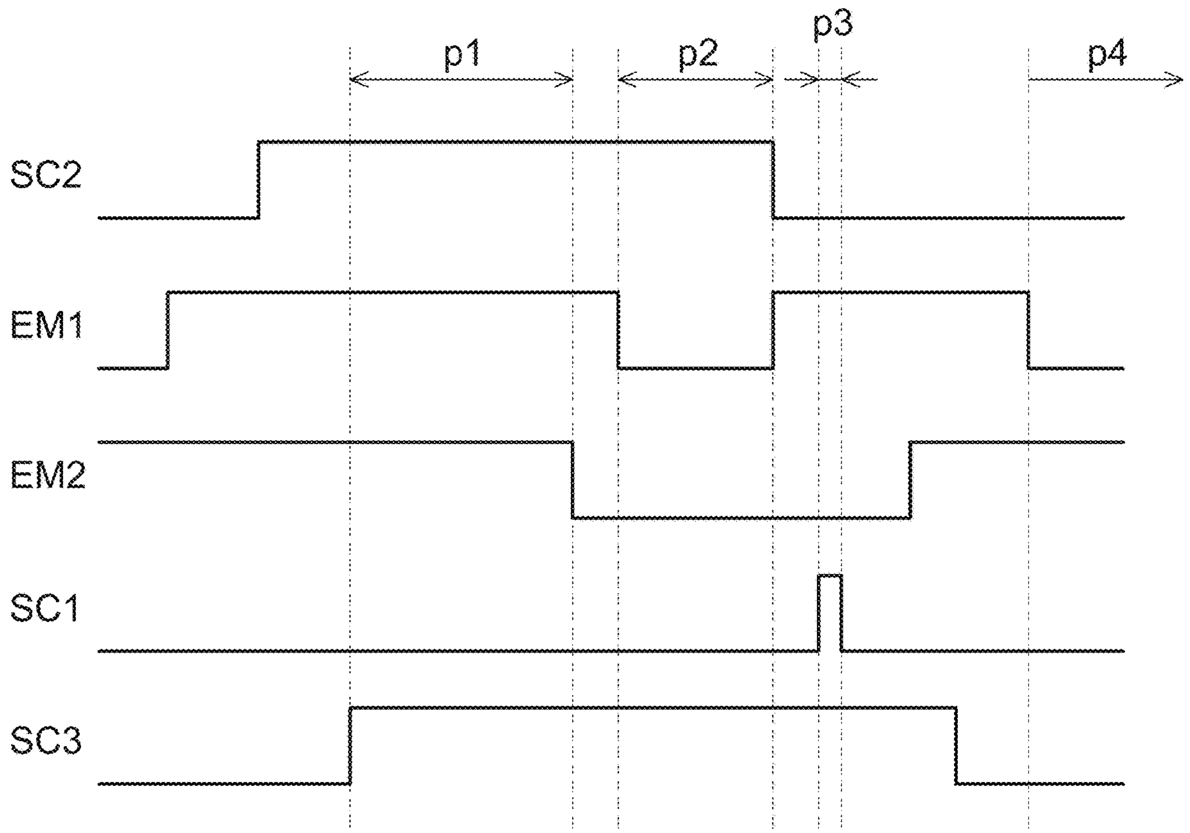
FIG. 3 is a view illustrating a waveform of a scan signal and an emission control signal in a pixel circuit illustrated in FIG. 2.

FIG. 3 is a view illustrating a waveform of a scan signal and an emission control signal in a pixel circuit illustrated in FIG. 2.

Figure 4A:
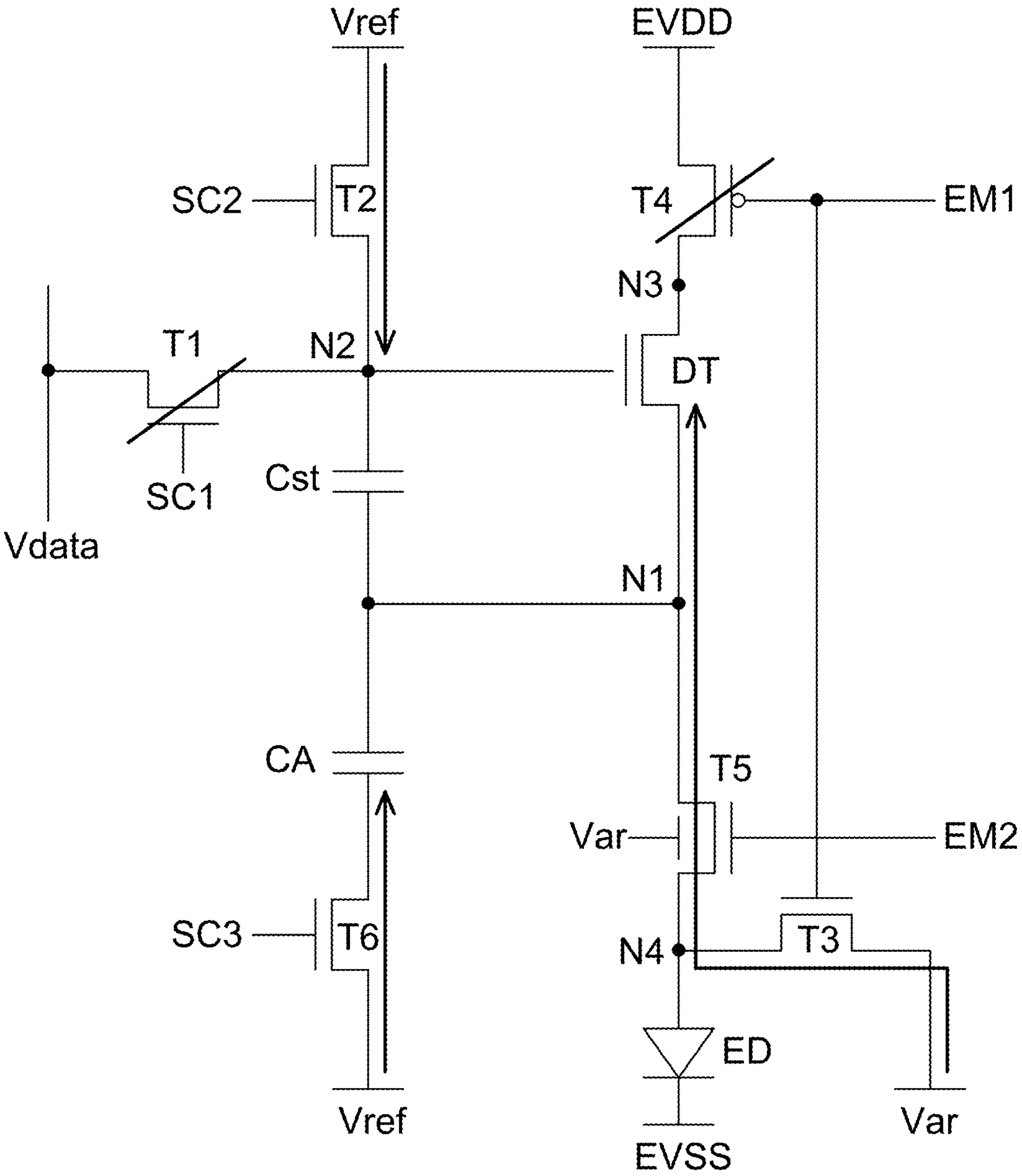
FIG. 4A is a view for explaining an operation of a pixel circuit of a display device according to an example embodiment of the present disclosure in an initialization period.

FIG. 4A is a view for explaining the operation of a pixel circuit of a display device according to an example embodiment of the present disclosure in an initialization period.

Figure 4B:
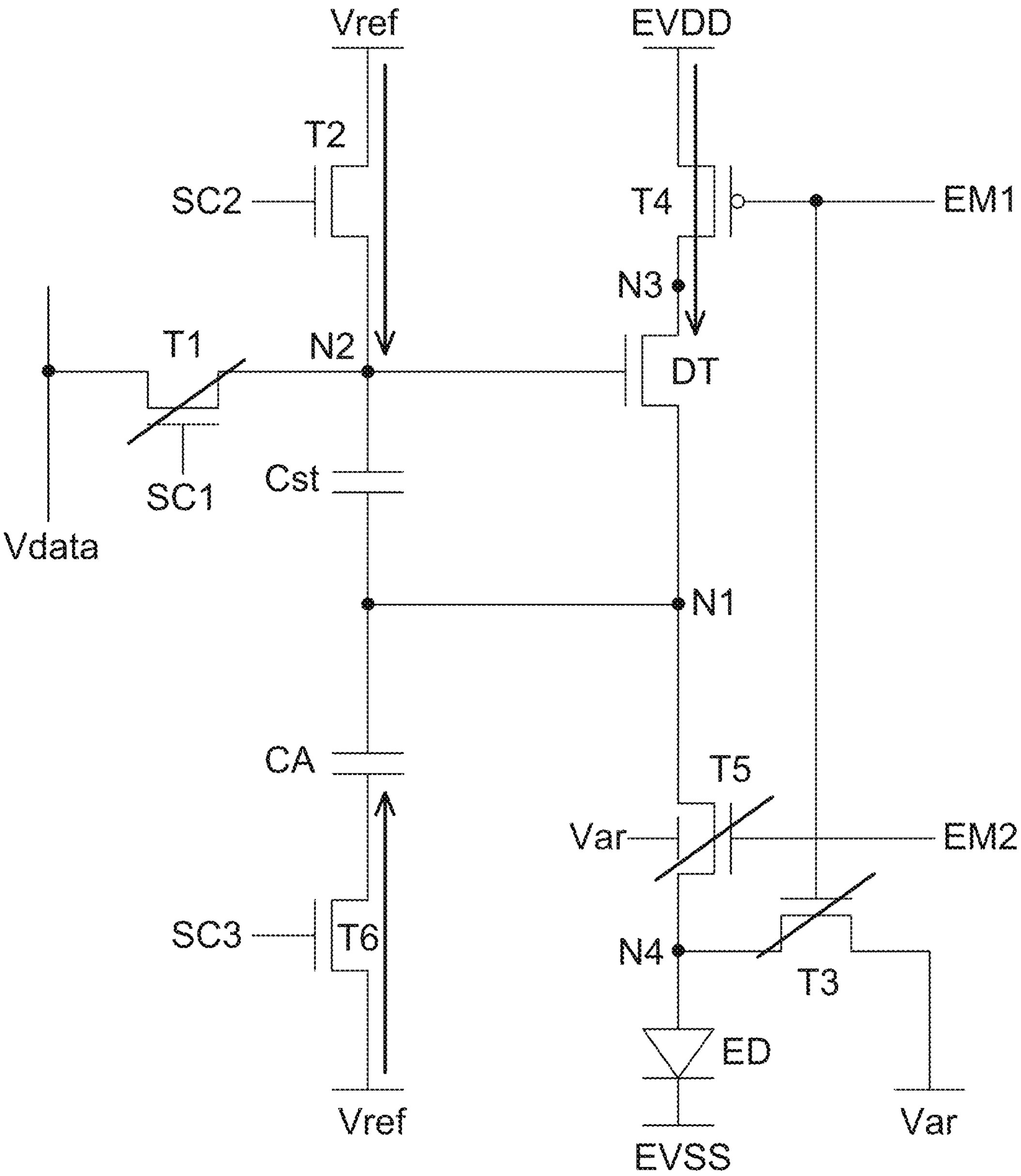
FIG. 4B is a view for explaining an operation of a pixel circuit of a display device according to an example embodiment of the present disclosure in a sampling period.

FIG. 4B is a view for explaining the operation of a pixel circuit of a display device according to an example embodiment of the present disclosure in a sampling period.

Figure 4C:
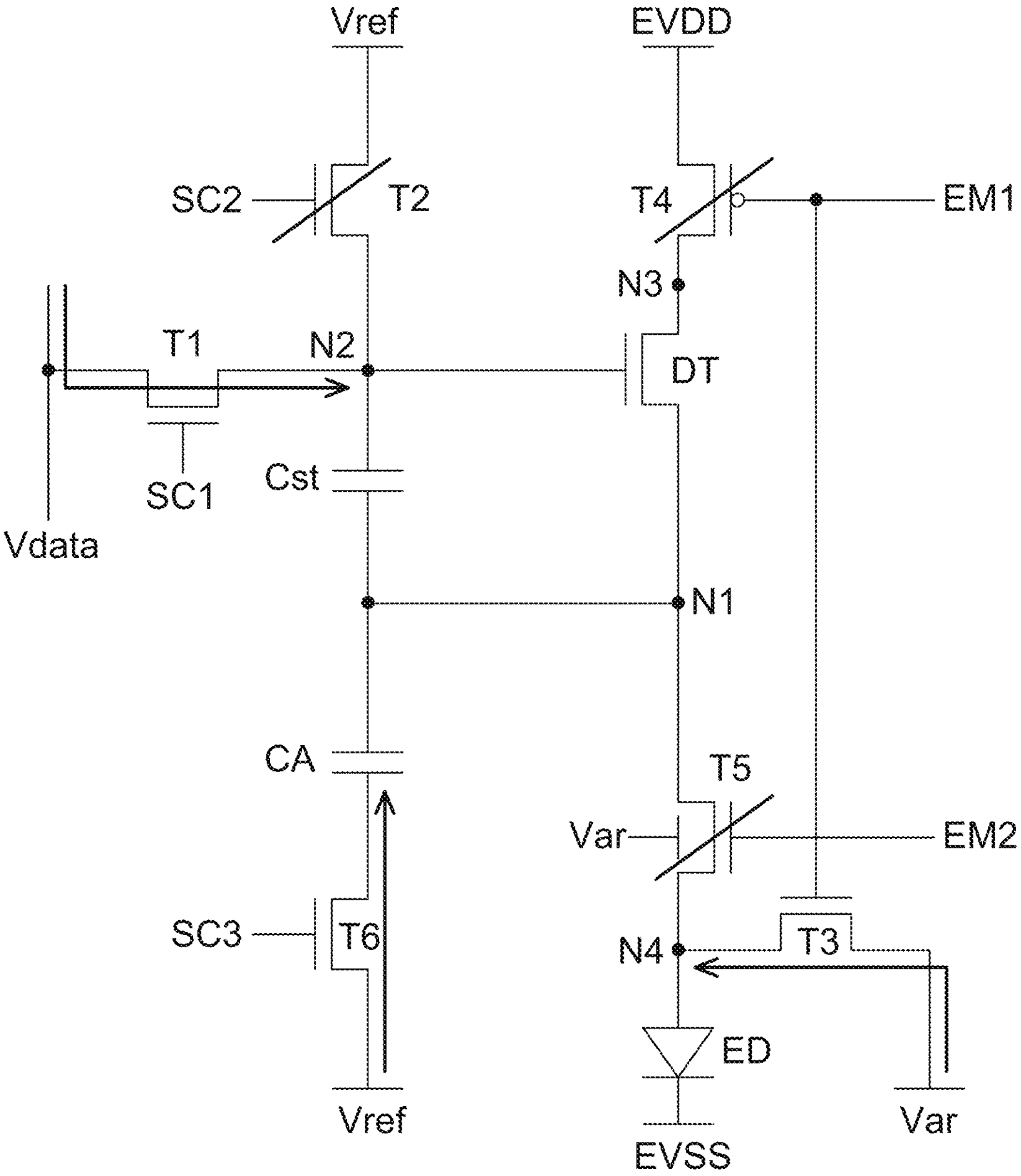
FIG. 4C is a view for explaining an operation of a pixel circuit of a display device according to an example embodiment of the present disclosure in a writing period.

FIG. 4C is a view for explaining the operation of a pixel circuit of a display device according to an example embodiment of the present disclosure in a writing period.

Figure 4D:
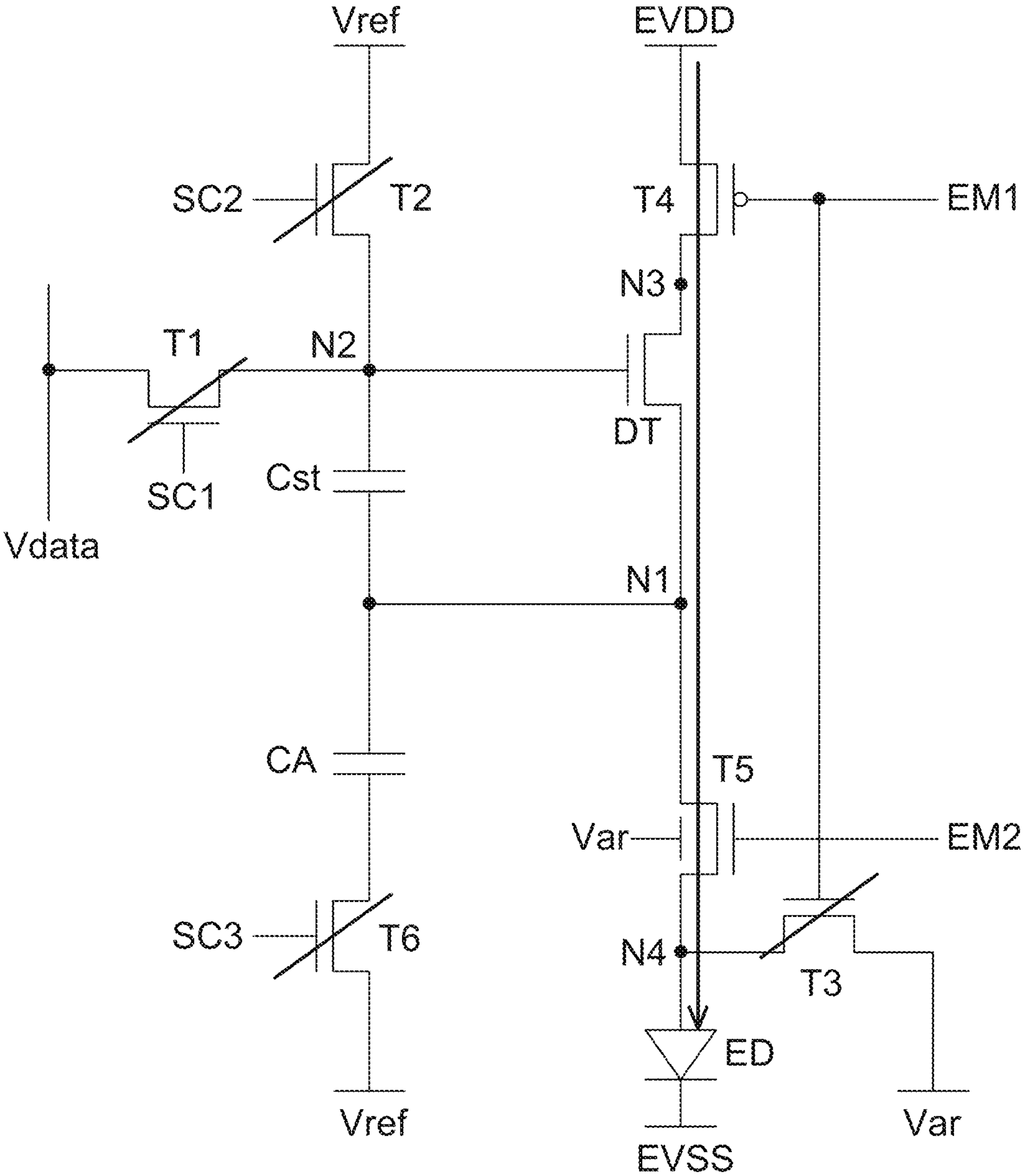
FIG. 4D is a view for explaining an operation of a pixel circuit of a display device according to an example embodiment of the present disclosure in an emission period.

FIG. 4D is a view for explaining the operation of a pixel circuit of a display device according to an example embodiment of the present disclosure in an emission period.

As shown in FIGS. 3 and 4A, the pixel circuit may operate during the initialization period p1 of the refresh period. The initialization period p1 is a period in which the voltage of the gate electrode of the driving transistor DT is initialized.

The second scan signal SC2, the third scan signal SC3, the first emission control signal EM1, and the second emission control signal EM2 are high level of voltages and the first scan signal SC1 is a low level of voltage. Therefore, the second transistor T2, the third transistor T3, the fifth transistor T5, and the sixth transistor T6 are turned on and the first transistor T1 and the fourth transistor T4 are turned off.

As the third transistor T3 and the fifth transistor T5 operate to be turned on, the reset voltage Var may be applied to the first node N1. Further, as the second transistor T2 operates to be turned on, the reference voltage Vref may be applied to the second node N2.

Therefore, a gate-source voltage Vgs of the driving transistor DT may be a difference between the reference voltage and the reset voltage Vref-Var.

Further, as shown in FIGS. 3 and 4B, the pixel circuit may operate during the sampling period p2 of the refresh period. The sampling period p2 is a period in which the threshold voltage Vth of the driving transistor DT is sampled.

The second scan signal SC2 and the third scan signal SC3 are high level of voltages and the first emission control signal EM1, the second emission control signal EM2, and the first scan signal SC1 are low level of voltages. In this case, the second transistor T2, the fourth transistor T4, and the sixth transistor T6 are turned on.

As the second transistor T2 operates to be turned on, the reference voltage Vref may be applied to the second node N2. Further, as the fourth transistor T4 operates to be turned on, the high potential driving voltage EVDD may be applied to the third node N3.

Therefore, the driving transistor DT may operate as a source-follower so that the gate-source voltage Vgs of the driving transistor DT may be sampled with the threshold voltage Vth of the driving transistor DT. Therefore, the voltage of the first node N1 may be a difference between the reference voltage and the threshold voltage Vref−Vth.

Further, as shown in FIGS. 3 and 4C, the pixel circuit may operate during the writing period p3 of the refresh period. In the writing period p3, the data voltage Vdata may be written in the driving transistor DT.

The first scan signal SC1, the third scan signal SC3, and the first emission control signal EM1 are high level of voltages and the second scan signal SC2 and the second emission control signal EM2 are low level of voltages. Therefore, the first transistor T1, the third transistor T3, and the sixth transistor T6 are turned on.

As the first transistor T1 operates to be turned on, the data voltage Vdata may be applied to the second node N2. Therefore, a voltage corresponding to a difference between the data voltage Vdata and the reference voltage Vref is divided by the plurality of capacitors Cst and CA to be reflected to the first node N1. Therefore, the voltage of Vref−Vth+(Vdata−Vref)(CA/CA+Cst) may be applied to the first node N1.

Further, the third transistor T3 is turned on to apply the reset voltage Var to the anode electrode of the light emitting diode ED to initialize a quantity of charges accumulated in the light emitting diode ED.

Further, as shown in FIGS. 3 and 4D, the pixel circuit may operate during the emission period p4 of the refresh period. The emission period p4 is a period in which the sampled threshold voltage Vth is cancelled and the driving current corresponding to the sampled data voltage allows the light emitting diode ED to emit light.

All the plurality of scan signals SC1, SC2, and SC3 and the first emission control signal EM1 are low level of voltages and the second emission control signal EM2 is a high level of voltage.

Therefore, the fourth transistor T4 and the fifth transistor T5 are turned on to form a current movement path through which a driving current generated by the driving transistor DT moves.

Specifically, as the fourth transistor T4 operates to be on, the connected high potential driving voltage EVDD is applied to the second electrode of the driving transistor DT connected to the third node N3. The driving current which is supplied from the driving transistor DT to the light emitting diode ED via the fifth transistor T5 becomes independent of the value of the threshold voltage Vth of the driving transistor DT so that the threshold voltage Vth of the driving transistor DT is compensated for operation.

To be more specific, the driving current corresponds to a square of the difference of the gate-source voltage Vgs and the threshold voltage Vth of the driving transistor DT. However, as described above, the gate-source voltage Vgs of the driving transistor DT is Vdata−Vref+Vth+(Vdata−Vref)(CA/CA+Cst) so that the driving current may be (Vdata−Vref+(Vdata−Vref)(CA/CA+Cst))^2.

Accordingly, the driving current may be independent of the value of the threshold voltage Vth of the driving transistor DT.

As described above, the fifth transistor T5 which is an emission control transistor may be an N-type oxide thin film transistor. The N-type oxide thin film transistor has advantages of a high electron mobility to have a high on-current, but also has disadvantages of long emission period, which causes lower driving reliability.

Hereinafter, a method for improving the reliability of the fifth transistor T5 which is an N-type oxide thin film transistor will be described.

Figure 5A:
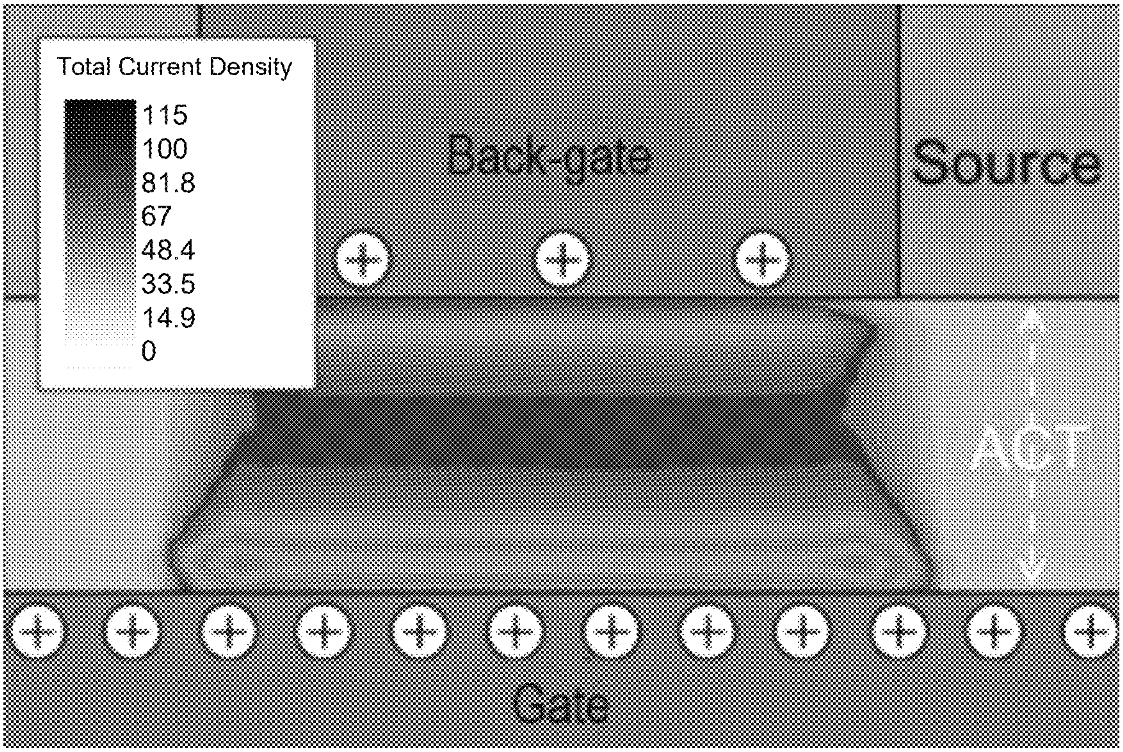
FIGS. 5A and 5B are views for channel formation of an active layer according to a plurality of gate electrode voltages in a fifth transistor of a display device according to an example embodiment of the present disclosure.
Figure 5B:
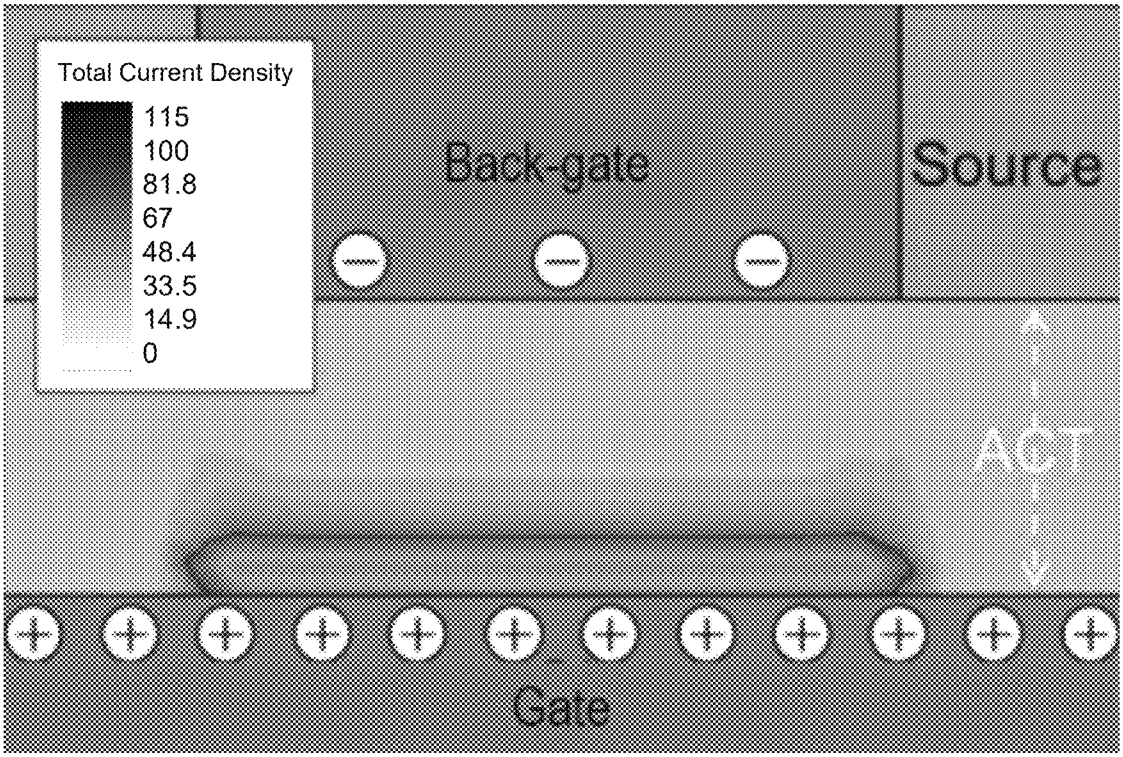

FIGS. 5A and 5B are views for channel formation of an active layer according to a plurality of gate electrode voltages in a fifth transistor of a display device according to an example embodiment of the present disclosure.

Specifically, in FIG. 5A, it is illustrated that positive voltages are applied to both a first gate electrode Gate and a second gate electrode Back-gate. In FIG. 5B, it is illustrated that a positive voltage is applied to the first gate electrode Gate and a negative voltage is applied to the second gate electrode Back-gate.

In FIG. 5A, when a positive voltage is applied to a first gate electrode Gate of the fifth transistor and a positive voltage is applied to a second gate electrode Back-gate, a high current density is formed from an active layer ACT region in the vicinity of the first gate electrode Gate to an active layer ACT region in the vicinity of the second gate electrode Back-gate. Therefore, it is confirmed that the wide channel of the active layer ACT is formed.

In contrast, in FIG. 5B, when a positive voltage is applied to the first gate electrode Gate of the fifth transistor and a negative voltage is applied to a second gate electrode Back-gate, a high current density is formed in the active layer ACT region in the vicinity of the first gate electrode Gate, but low current density is formed to an active layer ACT region in the vicinity of the second gate electrode Back-gate. Therefore, it is confirmed that a narrow channel of the active layer ACT is formed.

Figure 6A:
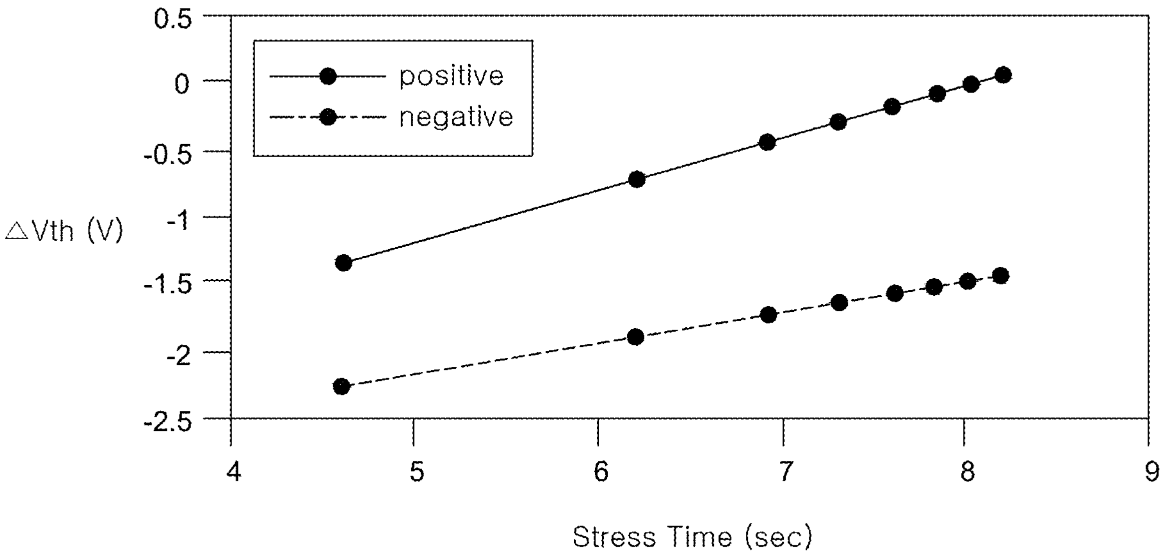
FIGS. 6A and 6B are views for a threshold voltage change according to a second gate electrode voltage in a fifth transistor of a display device according to an example embodiment of the present disclosure.
Figure 6B:
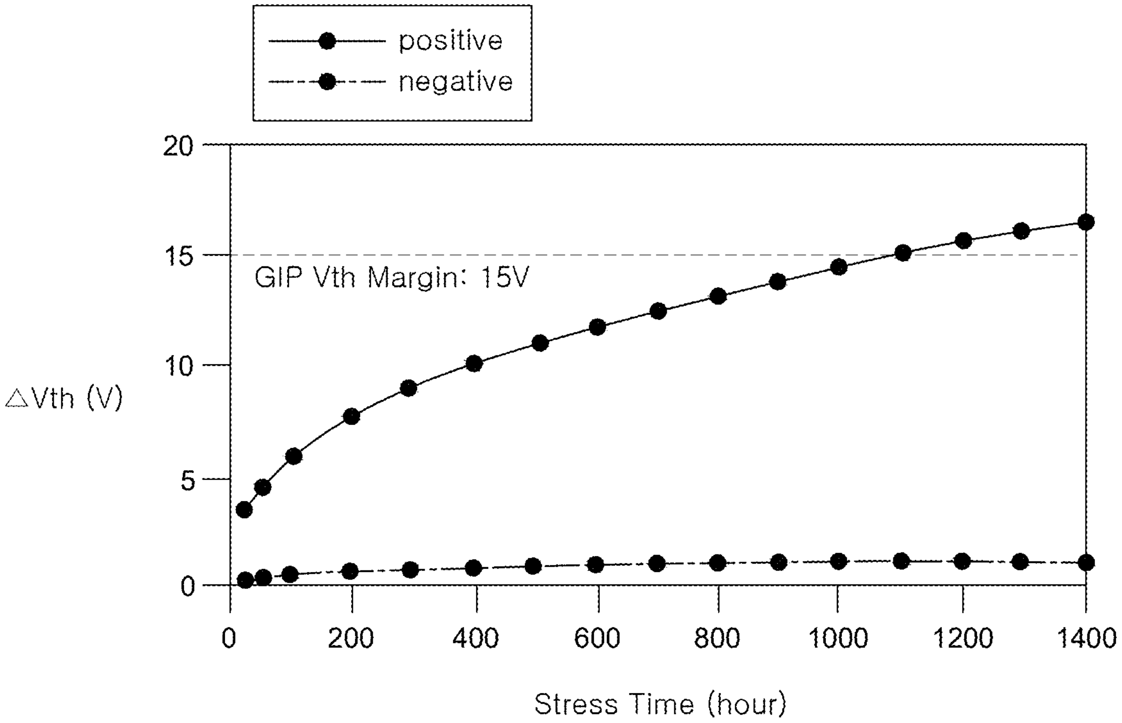

FIGS. 6A and 6B are views for a threshold voltage change according to a second gate electrode voltage in a fifth transistor of a display device according to an example embodiment of the present disclosure.

Specifically, FIG. 6A is a graph for an actual threshold voltage change according to a positive bias temperature stress (PBTS) application time in the fifth transistor and FIG. 6B is a graph for a predicted threshold voltage change according to a PBTS application time.

Further, in each of FIGS. 6A and 6B, graphs when a negative voltage is applied to the second gate electrode and a positive voltage is applied to the second gate electrode are illustrated, respectively. Further, as the PBTS application condition, at 60° C., the gate-source electrode of the fifth transistor is 30 V.

As shown in FIG. 6A, when the negative voltage negative is applied to the second gate electrode, a narrow channel is formed to cause a small change ΔVth in the threshold voltage, but when the positive voltage positive is applied to the second gate electrode, a wide channel is formed to cause a large change ΔVth in the threshold voltage.

Accordingly, as shown in FIG. 6B, when the PBTS is applied for approximately 1100 hours, if the negative voltage negative is applied to the second gate electrode, the threshold voltage is changed (ΔVth) to be equal to or less than 15 V which is a GIP Vth margin. In contrast, when the positive voltage positive is applied to the second gate electrode, the threshold voltage is changed (ΔVth) to be equal to or higher than 15 V which is the GIP Vth margin.

Accordingly, when the positive voltage positive is applied to the first gate electrode of the fifth transistor which is the N-type oxide thin film transistor and the negative voltage negative is applied to the second gate electrode, the change ΔVth of the threshold voltage may be minimized or reduced so that the reliability of the transistor may be improved.

Therefore, in the display device according to the example embodiment of the present disclosure, a voltage which is lower than a voltage applied to the first gate electrode of the fifth transistor which is an N-type oxide thin film transistor for emission control may be applied to the second gate electrode.

For example, a voltage lower than a voltage level of the second emission control signal EM2 which is applied to the first gate electrode of the fifth transistor may be applied to the second gate electrode.

A voltage lower than the voltage level of the second emission control signal EM2, such as the reference voltage Vref, the reset voltage Var, and the low potential driving voltage EVSS, may be applied to the second gate electrode of the fifth transistor.

In the example embodiment of the present disclosure, it has been described that the reset voltage Var is applied to the second gate electrode of the fifth transistor. However, the reset voltage may be modified to various voltages lower than the voltage level of the second emission control signal EM2, such as the reference voltage Vref and the low potential driving voltage EVSS.

As described above, in the display device according to the example embodiment of the present disclosure, when a voltage applied to a second gate electrode is lower than a voltage applied to a first gate electrode of an emission control transistor, a fluctuation of the threshold voltage is minimized or reduced to improve a reliability of an N-type oxide semiconductor transistor for emission control.

Figure 7A:
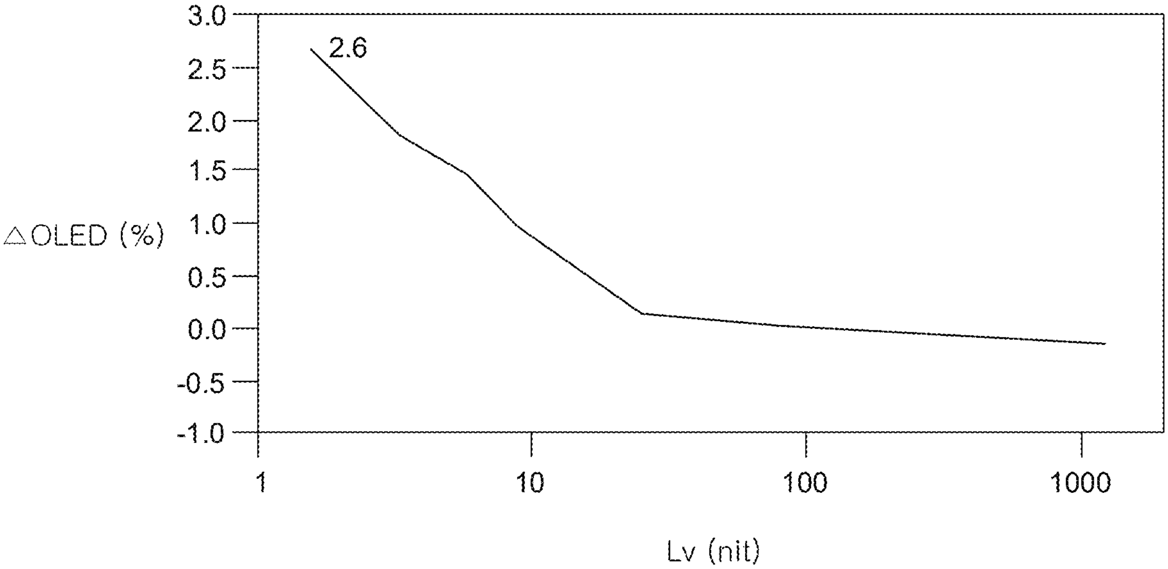
FIGS. 7A and 7B are views for a luminance change of a light emitting diode at every luminance of a display device according to an example embodiment of the present disclosure.
Figure 7B:
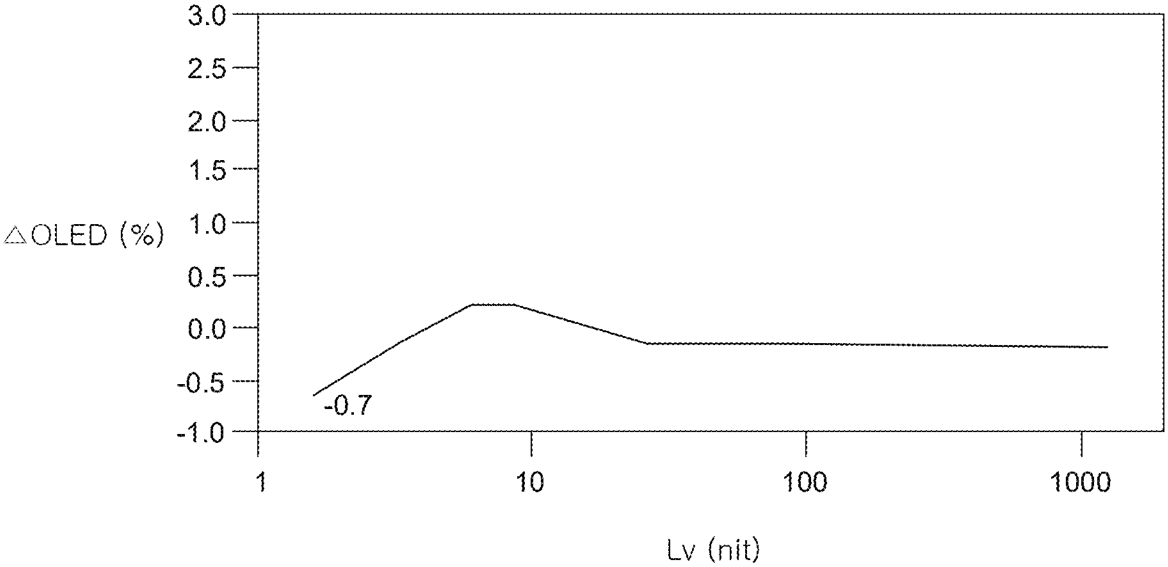

FIGS. 7A and 7B are views for a luminance change of a light emitting diode at every luminance of a display device according to an example embodiment of the present disclosure.

FIG. 7A is a view illustrating a luminance change of a light emitting diode at every luminance when a reset voltage is a constant power and FIG. 7B is a view illustrating a luminance change of a light emitting diode at every luminance when a reset voltage is a variable power.

As illustrated in FIG. 7A, when the reset voltage is a constant power, the luminance change ΔOLED of the light emitting diode is approximately 2.6% in a low luminance part (1 nit to 10 nit).

Therefore, in the display device according to the example embodiment of the present disclosure, to minimize or reduce the luminance change of the light emitting diode, a voltage for resetting the anode electrode of the light emitting diode may be modified.

That is, in the low luminance part (1 nit to 10 nit), to reset the anode electrode of the light emitting diode with a low voltage, the reset voltage Var may be varied to a low voltage.

Therefore, as illustrated in FIG. 7B, when the reset voltage Var varies in the low luminance part (1 nit to 10 nit), in the low luminance part (1 nit to 10 nit), the luminance change of the light emitting diode is just −0.6%.

Accordingly, in the display device according to an example embodiment of the present disclosure, a reset voltage varies according to a luminance of the light emitting diode so that the light emitting diode may express an exact or more precise gray scale level in all the luminance.

Hereinafter, the driving of the pixel circuit and the light emitting diode of a refresh period of a display device according to another example embodiment of the present disclosure will be described.

Figure 8:
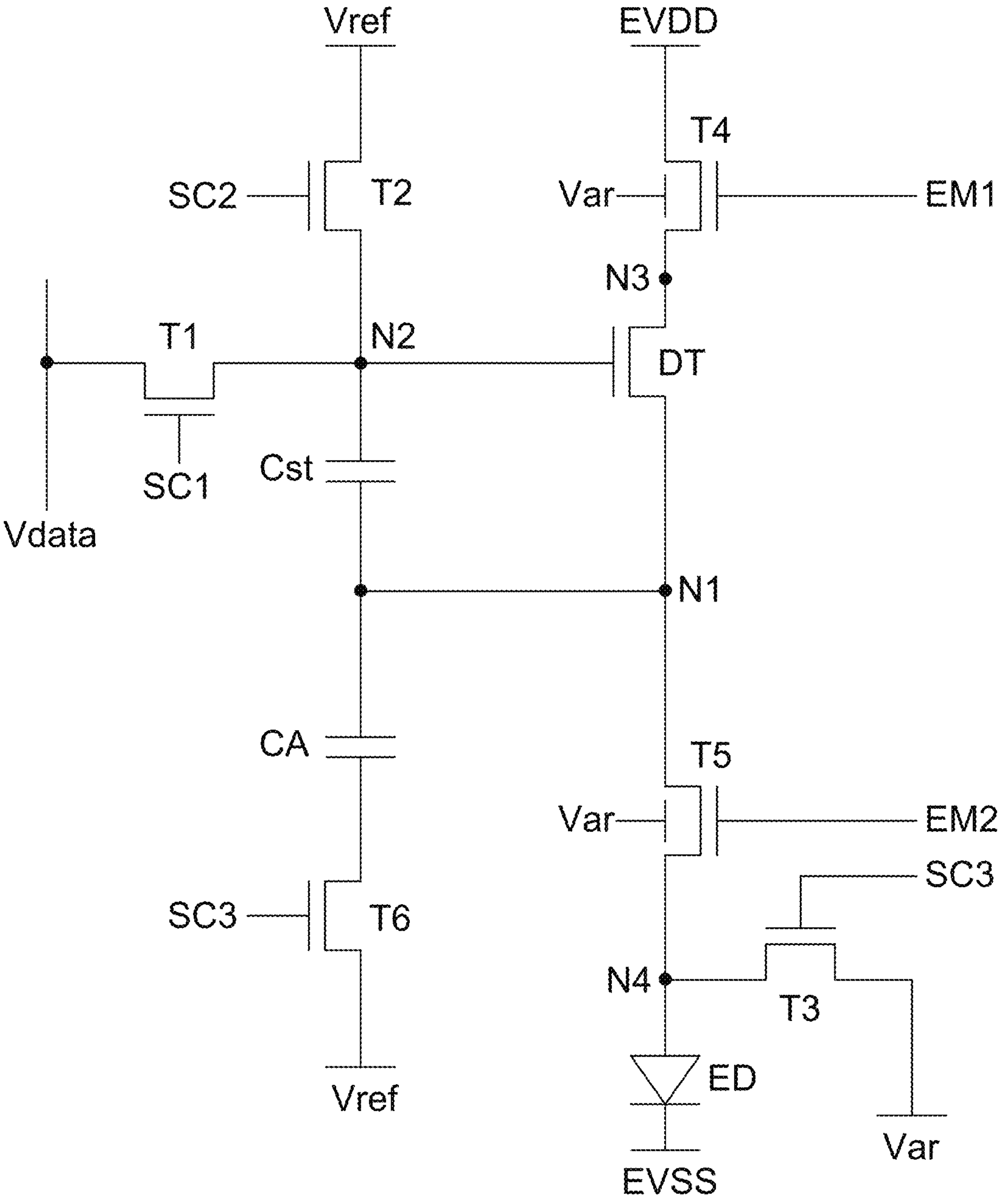
FIG. 8 is a view for an example pixel circuit in a display device according to another example embodiment of the present disclosure.

FIG. 8 is a view for a pixel circuit in a display device according to another example embodiment of the present disclosure.

As shown in FIG. 8, each of the plurality of pixels may include a pixel circuit having a driving transistor DT and a light emitting diode ED connected to the pixel circuit.

The pixel circuit controls the driving current which flows in the light emitting diode ED to drive the light emitting diode ED. The pixel circuit may include a driving transistor DT, first to sixth transistors T1 to T6, and a plurality of capacitors Cst and CA. Each of the transistors DT, T1 to T6 may include a first electrode, a second electrode, and a gate electrode. One of the first electrode and the second electrode may be a source electrode and the other one of the first electrode and the second electrode may be a drain electrode.

In the example embodiment of FIG. 8, transistors DT, T1 to T6 may be N-type thin film transistors. Further, the N-type thin film transistor may be an oxide thin film transistor. Accordingly, each of the transistors DT, T1 to T6 is applied with a high level of voltage to operate to be turned on.

According to an example, the first transistor T1 of the pixel circuit may serve as a data supply transistor, the second and sixth transistors T2 and T6 may serve as initialization transistors, third transistor T3 may serve as a reset transistor, and the fourth and fifth transistors T4 and T5 may serve as emission control transistors.

The light emitting diode ED may include an anode electrode and a cathode electrode. The anode electrode of the light emitting diode ED is connected to a fourth node N4 and the cathode electrode is connected to a low potential driving voltage EVSS.

The driving transistor DT may include a first electrode connected to a first node N1, a second electrode connected to a third node N3, and a gate electrode connected to a second node N2. The driving transistor DT may provide a driving current to the light emitting diode ED based on a voltage of the first node N1 (or a data voltage stored in a first capacitor Cst to be described below).

The first capacitor Cst may be connected or formed between the first node N1 and the second node N2. The first capacitor Cst may store or maintain a gate-source voltage Vgs of the driving transistor DT.

The first transistor T1 may include a first electrode which is connected to a data line DL (or receives a data voltage Vdata), a second electrode connected to the second node N2, and a gate electrode which receives a first scan signal SC1. The first transistor T1 is turned on in response to the first scan signal SC1 and transmits the data voltage Vdata to the second node N2. Such a second transistor T2 may be a data supply transistor.

The second transistor T2 may include a first electrode which receives a reference voltage Vref, a second electrode connected to the second node N2, and a gate electrode which receives the second scan signal SC2. The second transistor T2 is turned on in response to a second scan signal SC2 and transmits the reference voltage Vref to the second node N2. The second transistor T2 may be a first initialization transistor configured to initialize the second node N2 to the reference voltage Vref.

The third transistor T3 may include a first electrode which receives a reset voltage Var, a second electrode connected to the fourth node N4, and a gate electrode which receives the third scan signal SC3.

The third transistor T3 is turned on in response to the third scan signal SC3, before the light emitting diode ED emits light (or after the light emitting diode ED emits light) and resets the anode electrode (or the pixel electrode) of the light emitting diode ED using the reset voltage Var. The light emitting diode ED may have a parasitic capacitor formed between the anode electrode and the cathode electrode. Further, the parasitic capacitor is charged while the light emitting diode ED emits light so that the anode electrode of the light emitting diode ED may have a specific voltage. Accordingly, the reset voltage Var is applied to the anode electrode of the light emitting diode ED through the third transistor T3 to initialize a quantity of charges accumulated in the light emitting diode ED.

The fourth transistor T4 and the fifth transistor T5 (or first and second emission control transistors) are connected between the high potential driving voltage EVDD and the light emitting diodes ED and form a current movement path through which the driving current generated by the driving transistor DT moves.

The fourth transistor T4 may include a first electrode which receives a high potential driving voltage EVDD, a second electrode connected to the third node N3, a first gate electrode which receives a first emission control signal EM1, and a second gate electrode which receives a reset voltage Var.

The fifth transistor T5 may include a first electrode connected to the first node N1, a second electrode connected to the fourth node N4 (or the anode electrode of the light emitting diode ED), a first gate electrode which receives the second emission control signal EM2, and a second gate electrode which receives the reset voltage Var.

The fourth and fifth transistors T4 and T5 are turned on in response to the plurality of emission control signals EM1 and EM2 and the reset voltage Var and in this case, the driving current is supplied to the light emitting diode ED and the light emitting diode ED may emit light with a luminance corresponding to the driving current.

The sixth transistor T6 may include a first electrode which receives a reference voltage Vref, a second electrode connected to the second capacitor CA, and a gate electrode which receives the third scan signal SC3. The sixth transistor T6 is turned on in response to the third scan signal SC3 and transmits the reference voltage Vref to one electrode of the second capacitor CA. The sixth transistor T6 may be a second initialization transistor configured to initialize one electrode of the second capacitor CA to the reference voltage Vref.

The second capacitor CA may be connected or formed between the first node N1 and the second electrode of the sixth transistor T6. The second capacitor CA may store or maintain a voltage between the first node N1 and the second electrode of the sixth transistor T6.

Figure 9:
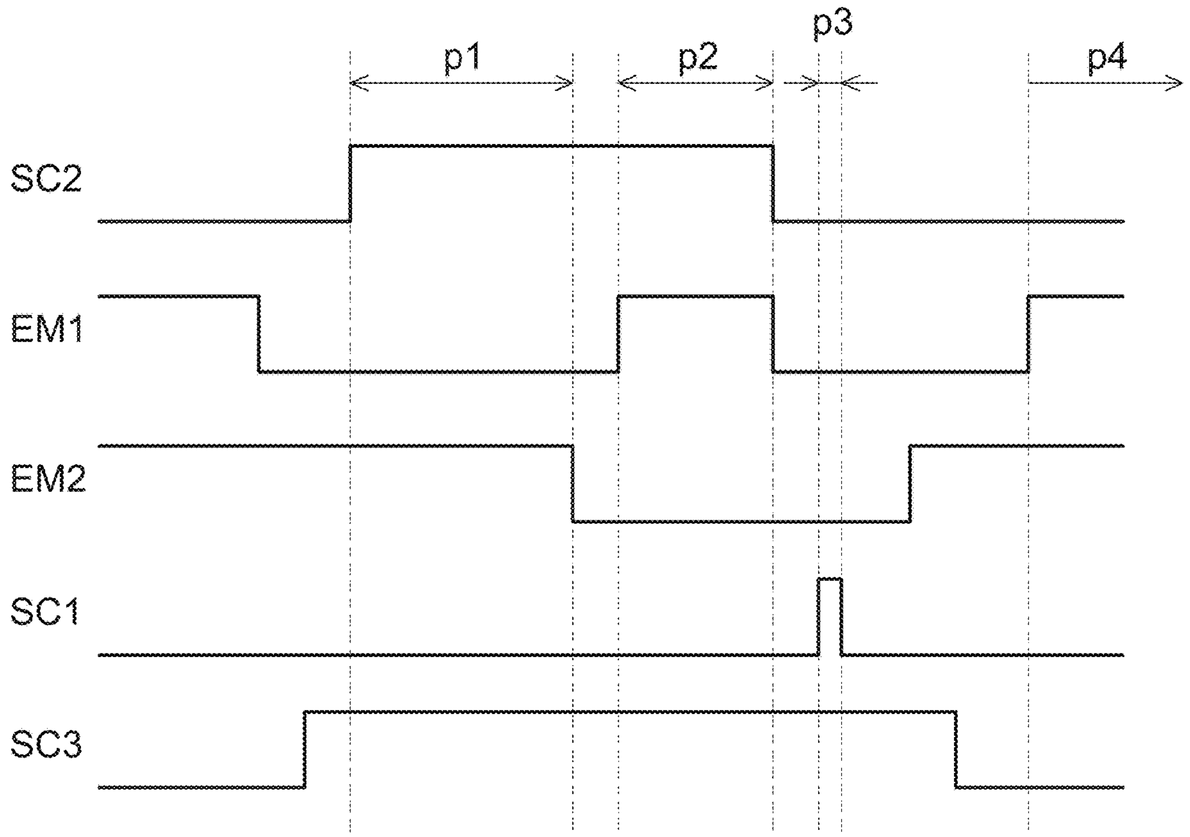
FIG. 9 is a view illustrating waveforms of a scan signal and an emission control signal in a pixel circuit illustrated in FIG. 8.

FIG. 9 is a view illustrating waveforms of a scan signal and an emission control signal in a pixel circuit illustrated in FIG. 8.

Figure 10A:
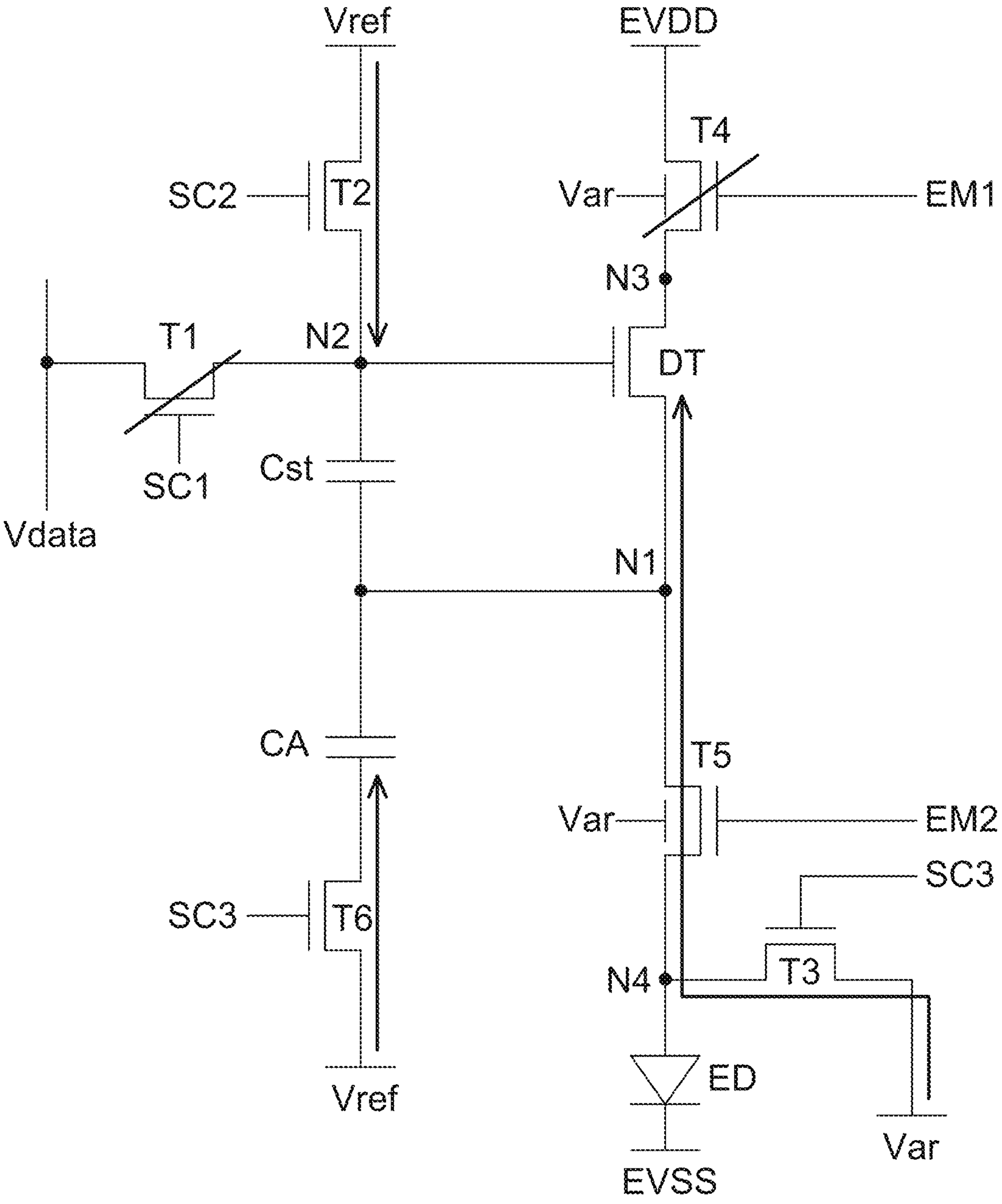
FIG. 10A is a view for explaining an operation of a pixel circuit of a display device according to another example embodiment of the present disclosure in an initialization period.

FIG. 10A is a view for explaining the operation of a pixel circuit of a display device according to another example embodiment of the present disclosure in an initialization period.

Figure 10B:
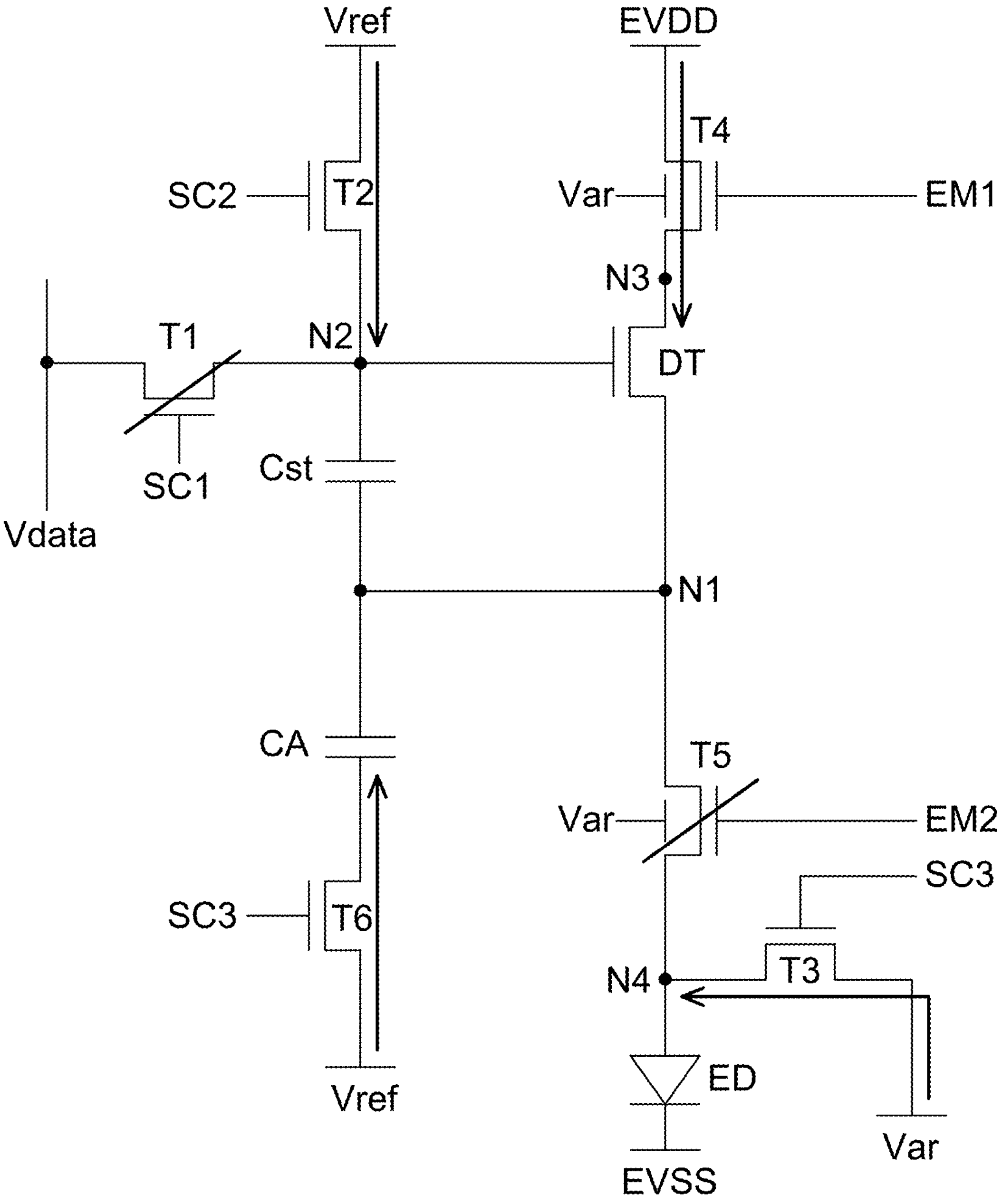
FIG. 10B is a view for explaining an operation of a pixel circuit of a display device according to another example embodiment of the present disclosure in a sampling period.

FIG. 10B is a view for explaining an operation of a pixel circuit of a display device according to another example embodiment of the present disclosure in a sampling period.

Figure 10C:
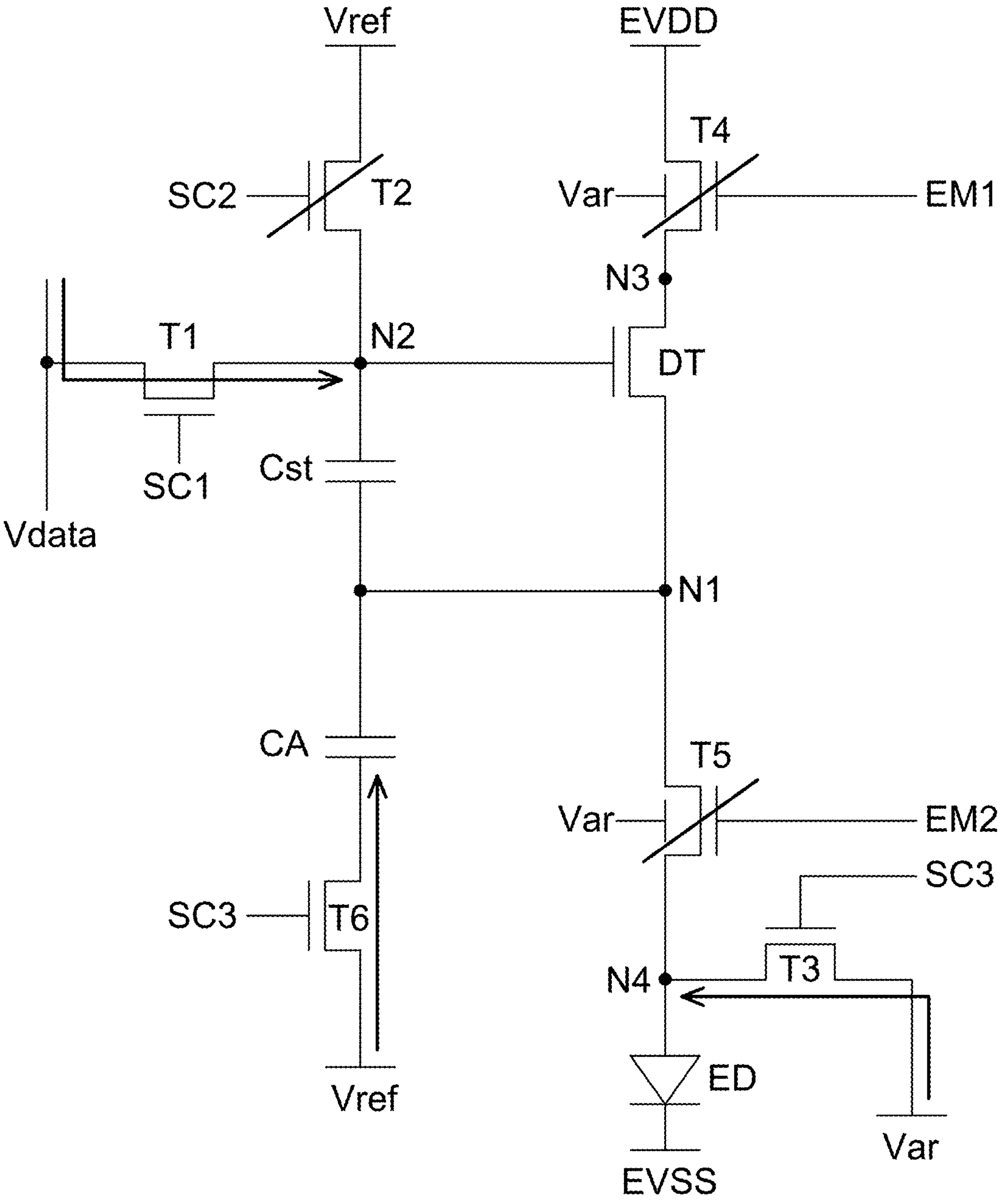
FIG. 10C is a view for explaining an operation of a pixel circuit of a display device according to another example embodiment of the present disclosure in a writing period.

FIG. 10C is a view for explaining an operation of a pixel circuit of a display device according to another example embodiment of the present disclosure in a writing period.

Figure 10D:
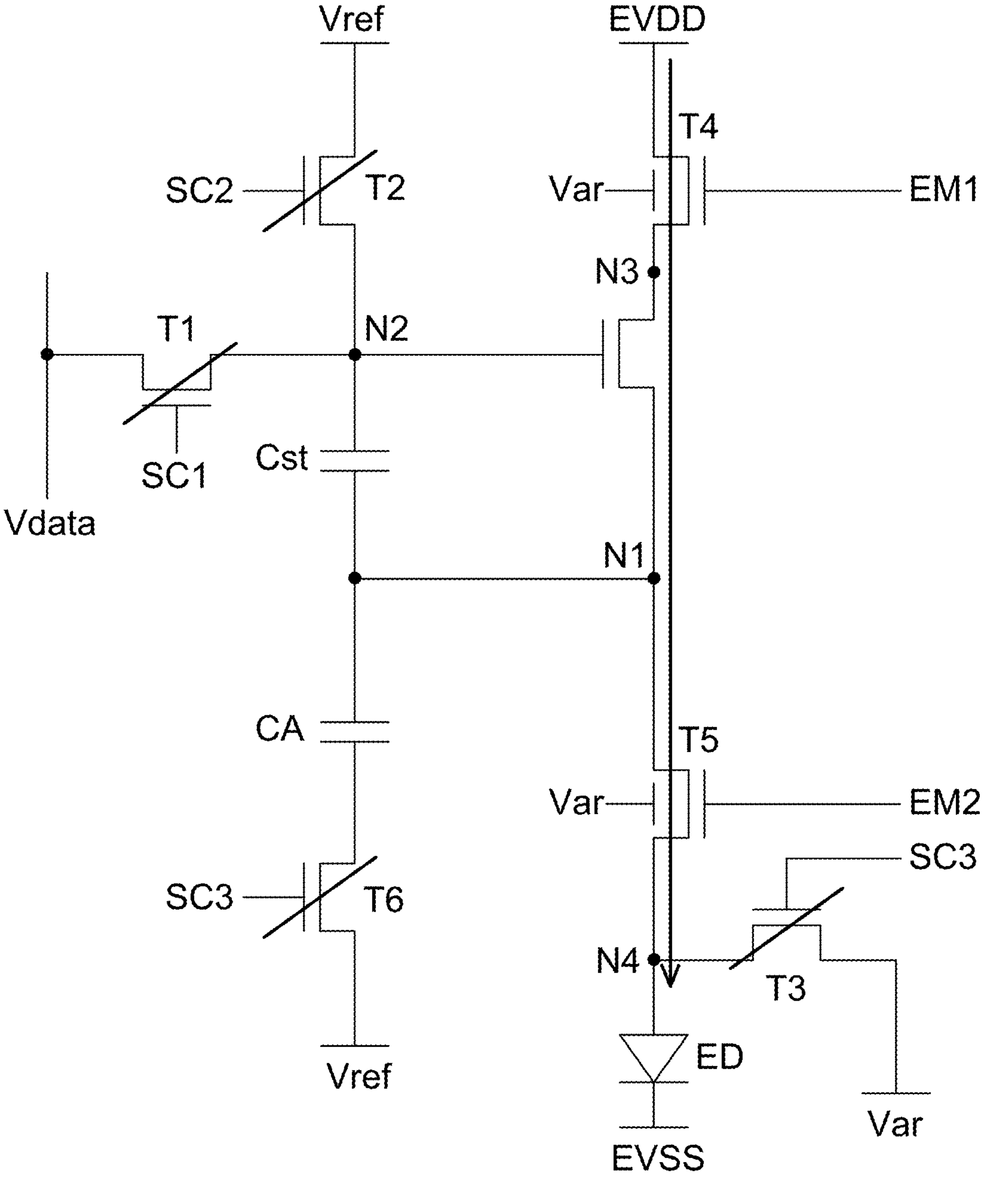
FIG. 10D is a view for explaining an operation of a pixel circuit of a display device according to an example embodiment of the present disclosure in an emission period.

FIG. 10D is a view for explaining an operation of a pixel circuit of a display device according to an example embodiment of the present disclosure in an emission period.

As shown in FIGS. 9 and 10A, the pixel circuit may operate during the initialization period p1 of the refresh period. The initialization period p1 is a period in which the voltage of the gate electrode of the driving transistor DT is initialized.

The second scan signal SC2, the third scan signal SC3, and the second emission control signal EM2 are high level of voltages and the first scan signal SC1 and the first emission control signal EM1 are low level of voltages. Therefore, the second transistor T2, the third transistor T3, the fifth transistor T5, and the sixth transistor T6 are turned on and the first transistor T1 and the fourth transistor T4 are turned off.

As the third transistor T3 and the fifth transistor T5 operate to be turned on, the reset voltage Var may be applied to the first node N1. Further, as the second transistor T2 operates to be turned on, the reference voltage Vref may be applied to the second node N2.

Therefore, a gate-source voltage Vgs of the driving transistor DT may be a difference between the reference voltage and the reset voltage Vref-Var.

Further, as shown in FIGS. 9 and 10B, the pixel circuit may operate during the sampling period p2 of the refresh period. The sampling period is a period in which the threshold voltage Vth of the driving transistor DT is sampled.

The first emission control signal EM1, and the second scan signal SC2 and the third scan signal SC3 are high level of voltages and the second emission control signal EM2 and the first scan signal SC1 are low level of voltages. In this case, the second transistor T2, the fourth transistor T4, and the sixth transistor T6 are turned on.

As the second transistor T2 operates to be turned on, the reference voltage Vref is applied to the second node N2. As the fourth transistor T4 operates to be turned on, the high potential driving voltage is applied to the third node N3.

Therefore, the driving transistor DT operates as a source-follower so that the gate-source voltage Vgs of the driving transistor DT is sampled with the threshold voltage Vth of the driving transistor DT. Therefore, the voltage of the first node N1 may be a difference between the reference voltage and the threshold voltage Vref−Vth.

Further, as shown in FIGS. 9 and 10C, the pixel circuit may operate during the writing period p3 of the refresh period. In the writing period, the data voltage Vdata may be written in the driving transistor DT.

The first scan signal SC1 and the third scan signal SC3 are high level of voltages and the first emission control signal EM1, the second scan signal SC2, and the second emission control signal EM2 are low level of voltages. Therefore, the first transistor T1, the third transistor T3, and the sixth transistor T6 are turned on.

As the first transistor T1 operates to be turned on, the data voltage Vdata may be applied to the second node N2. Therefore, a voltage corresponding to a difference between the data voltage Vdata and the reference voltage Vref is divided by the plurality of capacitors Cst and CA to be reflected to the first node N1. Therefore, the voltage of Vref−Vth+(Vdata−Vref)(CA/CA+Cst) may be applied to the first node N1.

Further, the third transistor T3 is turned on to apply the reset voltage Var to the anode electrode of the light emitting diode ED to initialize a quantity of charges accumulated in the light emitting diode ED.

Further, as shown in FIGS. 9 and 10D, the pixel circuit may operate during the emission period p4 of the refresh period. The emission period p4 is a period in which the sampled threshold voltage Vth is cancelled and the driving current corresponding to the sampled data voltage allows the light emitting diode ED to emit light.

All the plurality of scan signals SC1, SC2, and SC3 is low level of voltages and the plurality of emission control signals EM1 and EM2 are high level of voltages.

Therefore, the fourth transistor T4 and the fifth transistor T5 are turned on to form a current movement path through which a driving current generated by the driving transistor DT moves.

Specifically, as the fourth transistor T4 operates to be on, the connected high potential driving voltage EVDD is applied to the second electrode of the driving transistor DT connected to the third node N3. The driving current which is supplied from the driving transistor DT to the light emitting diode ED via the fifth transistor T5 becomes independent of the value of the threshold voltage Vth of the driving transistor DT so that the threshold voltage Vth of the driving transistor DT is compensated for operation.

To be more specific, the driving current corresponds to a square of the difference of the gate-source voltage Vgs and the threshold voltage Vth of the driving transistor DT. However, as described above, the gate-source voltage Vgs of the driving transistor DT is Vdata−Vref+Vth+(Vdata−Vref)(CA/CA+Cst) so that the driving current may be (Vdata−Vref+(Vdata−Vref)(CA/CA+Cst))^2.

Accordingly, the driving current may be independent of the value of the threshold voltage Vth of the driving transistor DT.

In the display device according to another example embodiment of the present disclosure, a voltage which is lower than a voltage applied to the first gate electrode of the fourth and fifth transistors which are N-type oxide thin film transistors for emission control is applied to the second gate electrode.

For example, a voltage lower than a voltage level of the first emission control signal EM1 which is applied to the first gate electrode of the fourth transistor is applied to the second gate electrode.

A voltage lower than the voltage level of the first emission control signal EM1, such as the reference voltage Vref, the reset voltage Var, and the low potential driving voltage EVSS, may be applied to the second gate electrode of the fourth transistor.

Further, a voltage lower than a voltage level of the second emission control signal EM2 which is applied to the first gate electrode of the fifth transistor is applied to the second gate electrode.

A voltage lower than the voltage level of the second emission control signal EM2, such as the reference voltage Vref, the reset voltage Var, and the low potential driving voltage EVSS, may be applied to the second gate electrode of the fifth transistor.

In the example embodiment of the present disclosure, it has been described that the reset voltage Var is applied to the second gate electrodes of the fourth and fifth transistors. However, the reset voltage may be modified to various voltages lower than the voltage level of the second emission control signal EM2, such as the reference voltage Vref and the low potential driving voltage EVSS.

As described above, in the display device according to the example embodiment of the present disclosure, when a voltage applied to a second gate electrode is lower than a voltage applied to a first gate electrode of an emission control transistor, a fluctuation of the threshold voltage is minimized or reduced to improve a reliability of an N-type oxide semiconductor transistor for emission control.

The example embodiments of the present disclosure can also be described as follows:

According to an aspect of the present disclosure, a display device may include a plurality of pixels configured to implement an image, each of the plurality of pixels including a light emitting diode and a pixel circuit connected to the light emitting diode, the pixel circuit including a driving transistor which may include a first electrode connected to a first node, a gate electrode connected to a second node, and a second electrode connected to a third node and may be configured to control a driving current flowing through the light emitting diode; a first capacitor configured to store a gate-source voltage Vgs of the driving transistor; a second capacitor connected to the first node; a first transistor configured to apply a data voltage to the driving transistor; a second transistor configured to initialize a gate electrode of the driving transistor; a third transistor configured to reset the light emitting diode; a fourth transistor and a fifth transistor configured to form a current movement path through which the driving current moves; and a sixth transistor configured to initialize the second capacitor, wherein at least one of the fourth transistor and the fifth transistor may include a first gate electrode and a second gate electrode, and a voltage applied to the first gate electrode may be lower than a voltage applied to the second gate electrode.

The first transistor may include a first electrode connected to a data line, a second electrode connected to the second node, and a gate electrode which receives a first scan signal, the second transistor includes a first electrode which receives a reference voltage, a second electrode connected to the second node, and a gate electrode which receives a second scan signal, and the sixth transistor may include a first electrode which receives the reference voltage, a second electrode connected to the second capacitor, and a gate electrode which receives a third scan signal.

The third transistor may include a first electrode which receives a reset voltage, a second electrode connected to an anode electrode of the light emitting diode, and a gate electrode which receives a first emission control signal.

The third transistor may include a first electrode which receives a reset voltage, a second electrode connected to an anode electrode of the light emitting diode, and a gate electrode which receives a third scan signal.

The reset voltage may vary according to a luminance of the light emitting diode.

The fourth transistor may include a first electrode which receives a high potential driving voltage, a second electrode connected to the third node, and a gate electrode which receives a first emission control signal.

The fourth transistor may be a P-type polycrystalline silicon transistor.

The fourth transistor may include a first electrode which receives a high potential driving voltage, a second electrode connected to the third node, a first gate electrode which receives a first emission control signal, and a second gate electrode which receives a reset voltage.

The fourth transistor may be an N-type oxide transistor.

A level of the reset voltage may be lower than a voltage level of the first emission control signal.

The fifth transistor may include a first electrode connected to the first node, a second electrode connected to an anode electrode of the light emitting diode, a first gate electrode which receives a second emission control signal, and a second gate electrode which receives a reset voltage.

The fifth transistor may be an N-type oxide transistor.

A level of the reset voltage may be lower than a voltage level of the second emission control signal.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. All the technical concepts in the equivalent scope of the present disclosure should be construed as falling within the scope of the present disclosure.

What is claimed is:

1. A display device, comprising:

a plurality of pixels configured to implement an image, each of the plurality of pixels including a light emitting diode and a pixel circuit connected to the light emitting diode, the pixel circuit including:

a driving transistor which includes a first electrode connected to a first node, a gate electrode connected to a second node, and a second electrode connected to a third node and is configured to control a driving current flowing through the light emitting diode;

a first capacitor configured to store a gate-source voltage of the driving transistor;

a second capacitor connected to the first node;

a first transistor configured to apply a data voltage to the driving transistor;

a second transistor configured to initialize a gate electrode of the driving transistor;

a third transistor configured to reset the light emitting diode;

a fourth transistor and a fifth transistor configured to form a current movement path through which the driving current moves; and a sixth transistor configured to initialize the second capacitor, wherein at least one of the fourth transistor and the fifth transistor includes a first gate electrode and a second gate electrode, and wherein a voltage applied to the first gate electrode is lower than a voltage applied to the second gate electrode.

2. The display device according to claim 1, wherein:

the first transistor includes a first electrode connected to a data line, a second electrode connected to the second node, and a gate electrode configured to receive a first scan signal;

the second transistor includes a first electrode configured to receive a reference voltage, a second electrode connected to the second node, and a gate electrode configured to receive a second scan signal; and the sixth transistor includes a first electrode configured to receive the reference voltage, a second electrode connected to the second capacitor, and a gate electrode configured to receive a third scan signal.

3. The display device according to claim 1, wherein the third transistor includes a first electrode configured to receive a reset voltage, a second electrode connected to an anode electrode of the light emitting diode, and a gate electrode configured to receive a first emission control signal.

4. The display device according to claim 3, wherein the reset voltage is configured to vary according to a luminance of the light emitting diode.

5. The display device according to claim 1, wherein the third transistor includes a first electrode configured to receive a reset voltage, a second electrode connected to an anode electrode of the light emitting diode, and a gate electrode configured to receive a third scan signal.

6. The display device according to claim 5, wherein the reset voltage is configured to vary according to a luminance of the light emitting diode.

7. The display device according to claim 1, wherein the fourth transistor includes a first electrode configured to receive a high potential driving voltage, a second electrode connected to the third node, and a gate electrode configured to receive a first emission control signal.

8. The display device according to claim 7, wherein the fourth transistor is a P-type polycrystalline silicon transistor.

9. The display device according to claim 1, wherein the fourth transistor includes a first electrode configured to receive a high potential driving voltage, a second electrode connected to the third node, a first gate electrode configured to receive a first emission control signal, and a second gate electrode configured to receive a reset voltage.

10. The display device according to claim 9, wherein the fourth transistor is an N-type oxide transistor.

11. The display device according to claim 9, wherein a level of the reset voltage is lower than a voltage level of the first emission control signal.

12. The display device according to claim 1, wherein the fifth transistor includes a first electrode connected to the first node, a second electrode connected to an anode electrode of the light emitting diode, a first gate electrode configured to receive a second emission control signal, and a second gate electrode configured to receive a reset voltage.

13. The display device according to claim 12, wherein the fifth transistor is an N-type oxide transistor.

14. The display device according to claim 12, wherein a level of the reset voltage is lower than a voltage level of the second emission control signal.

* * * * *